United States Patent
Roy et al.

(10) Patent No.: US 10,025,978 B2
(45) Date of Patent: Jul. 17, 2018

(54) ASSIGNING OF TOPICAL ICONS TO DOCUMENTS TO IMPROVE FILE NAVIGATION

(71) Applicant: Adobe Systems Incorporated, San Jose, CA (US)

(72) Inventors: Rishiraj Saha Roy, West Bengal (IN); Prashant Chawla, Distt-Solan (IN); Shubham Saxena, Gujarat (IN); Atanu R. Sinha, Boulder, CO (US); Abhijeet Singh, Assam (IN)

(73) Assignee: ADOBE SYSTEMS INCORPORATED, San Jose, CA (US)

( * ) Notice: Subject to any disclaimer, the term of this patent is extended or adjusted under 35 U.S.C. 154(b) by 444 days.

(21) Appl. No.: 14/854,936

(22) Filed: Sep. 15, 2015

(65) Prior Publication Data

US 2017/0076151 A1    Mar. 16, 2017

(51) Int. Cl.
| | |
|---|---|
| *G06F 17/30* | (2006.01) |
| *G06K 9/00* | (2006.01) |
| *G06K 9/62* | (2006.01) |
| *G06F 17/27* | (2006.01) |

(52) U.S. Cl.
CPC ..... *G06K 9/00456* (2013.01); *G06F 17/2775* (2013.01); *G06F 17/30126* (2013.01); *G06K 9/00469* (2013.01); *G06K 9/00483* (2013.01); *G06K 9/6215* (2013.01); *G06K 9/6218* (2013.01)

(58) Field of Classification Search
CPC ................................................. G06F 17/30126
See application file for complete search history.

(56) References Cited

U.S. PATENT DOCUMENTS

| | | | | |
|---|---|---|---|---|
| 5,787,422 A | * | 7/1998 | Tukey | G06F 17/30707 |
| 5,991,756 A | * | 11/1999 | Wu | G06F 17/30616 |
| | | | | 707/706 |
| 2002/0140744 A1 | * | 10/2002 | Kanevsky | G06F 3/04817 |
| | | | | 715/839 |
| 2007/0061319 A1 | * | 3/2007 | Bergholz | G06F 17/3071 |

* cited by examiner

*Primary Examiner* — Kris E Mackes
(74) *Attorney, Agent, or Firm* — Keller Jolley Preece

(57) ABSTRACT

Systems and methods disclosed select and display icons corresponding to topics of digital documents. In particular, in one or more embodiments, systems and methods identify similar clusters of documents from a plurality of documents and generate icons for each identified cluster of documents. For instance, systems and methods identify topical phrases from identified clusters and utilize the topical phrases to identify icons corresponding to the topical phrases. More specifically, one or more embodiments include systems and methods that generate generalized terms from topical phrases utilizing a concept taxonomy and then identify icons by comparing the generated generalized terms to tags corresponding to a plurality of icons.

20 Claims, 12 Drawing Sheets

ASSIGNING OF TOPICAL ICONS TO DOCUMENTS TO IMPROVE FILE NAVIGATION

BACKGROUND

1. Technical Field

The present disclosure relates generally to digital file navigation. More specifically, one or more embodiments of the present disclosure relate to systems and methods that generate icons to assist in navigation of digital documents.

2. Background and Relevant Art

Individuals increasingly use computing devices for a growing variety of daily tasks. For example, businesses, governments, and individuals utilize personal computers, smartphones, and laptops for tasks ranging from blogging to working; web-surfing to accounting; and entertaining to exercising. Indeed, there are very few aspects of individual life that remain untouched by digital devices.

With this increased proliferation of computing devices has come a corresponding increase in electronic documents. Indeed, individuals commonly create and access electronic documents on a daily basis, resulting in ever-expanding repositories of digital information. For example, it is not uncommon for individual users to have folders containing hundreds (if not thousands) of electronic documents, such as word processing files, images, presentations, or spreadsheets.

Unlike real-world documents, digital documents stored in a computing device have no tangible physical presence that a user can utilize to search for and identify particular documents. Indeed, because many users do not have the time (or know-how) to systematically name and organize digital files, users often expend significant efforts searching for digital documents within their own digital files. Accordingly, there is an increasing demand for improved systems and methods to navigate, locate, and identify electronic documents.

Some common systems seek to address the difficulty of navigating electronic documents by allowing users to perform digital queries. For example, some common systems allow a user to run a search based on a title of a document or a document type. Although such systems can assist in finding a document, users frequently express frustration with the time required by such systems and the frustration associated with sorting through results. Moreover, because such systems require a user to manually enter information regarding a digital document, users frequently experience frustration when they lack sufficient information regarding the document for purposes of running an effective search (e.g., a user may forgot the name of a particular document).

Other common systems exist that display information about digital documents that a user can navigate to locate a particular document. For instance, some common systems provide icons representing documents of a particular format (e.g., an icon for all PDF files) that a user can review. Users often express frustration with the time and effort required to search through lists of icons reflecting document formats, particularly where a digital folder contains numerous documents. Indeed, in file repositories containing thousands of documents of a single type, systems that display formatting icons often fail to provide users with an efficient way to identify pertinent documents.

These and other problems exist with regard to navigating digital files using conventional systems and methods.

BRIEF SUMMARY

Embodiments of the present disclosure provide benefits and/or solve one or more of the foregoing or other problems in the art with systems and methods that generate and present icons reflecting topics associated with digital documents. In particular, the disclosed systems and methods can identify topics associated with documents and assign icons to the digital documents based on the identified topics. By providing icons related to the topic of a document, systems and methods can increase the speed of locating and navigating to a particular document within a large document repository.

For example, in one or more embodiments, the disclosed systems and methods utilize a clustering algorithm to generate a cluster of documents from a plurality of documents containing text. Moreover, the disclosed systems and methods extract topical phrases from the text of documents in the cluster of documents. In addition, systems and methods identify an icon based on the topical phrases, and for each document in the cluster of documents, provide the identified icon for display.

By generating and presenting icons related to topics contained within digital documents, the disclosed systems and methods increase the speed and ease of navigating a plurality of digital documents. For instance, the disclosed systems and methods can group digital documents addressing similar topics together with similar icons, thus allowing a user to quickly identify documents addressing a particular topic.

Moreover, by providing topical icons based on a corpus of digital documents, the disclosed systems and methods can provide context-specific visual cues that increase efficiency and speed of navigating documents in digital folders of varying size or contents. For instance, in one or more embodiments, the disclosed systems and methods identify topics and icons from the text of clusters of related documents in a digital folder. Accordingly, the topics and icons selected by the disclosed systems and methods are specific to the contours of the particular digital documents in a folder. Indeed, an icon for an individual document can change depending on the content of the individual document and other surrounding documents. Thus, the disclosed systems and methods can provide context-specific icons that differentiate documents as a corpus of documents changes.

Additional features and advantages of exemplary embodiments of the present disclosure will be set forth in the description which follows, and in part will be obvious from the description, or may be learned by the practice of such exemplary embodiments. The features and advantages of such embodiments may be realized and obtained by means of the instruments and combinations particularly pointed out in the appended claims. These and other features will become more fully apparent from the following description and appended claims, or may be learned by the practice of such exemplary embodiments as set forth hereinafter. The foregoing summary is not an extensive overview, and it is not intended to identify key elements or indicate a scope. Rather the foregoing summary identifies aspects of embodiments as a prelude to the detailed description presented below.

BRIEF DESCRIPTION OF THE DRAWINGS

In order to describe the manner in which the above recited and other advantages and features of the invention can be obtained, a more particular description of the invention briefly described above will be rendered by reference to specific embodiments thereof that are illustrated in the appended drawings. It should be noted that the figures are not drawn to scale, and that elements of similar structure or function are generally represented by like reference numerals for illustrative purposes throughout the figures. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

Figure 1A:
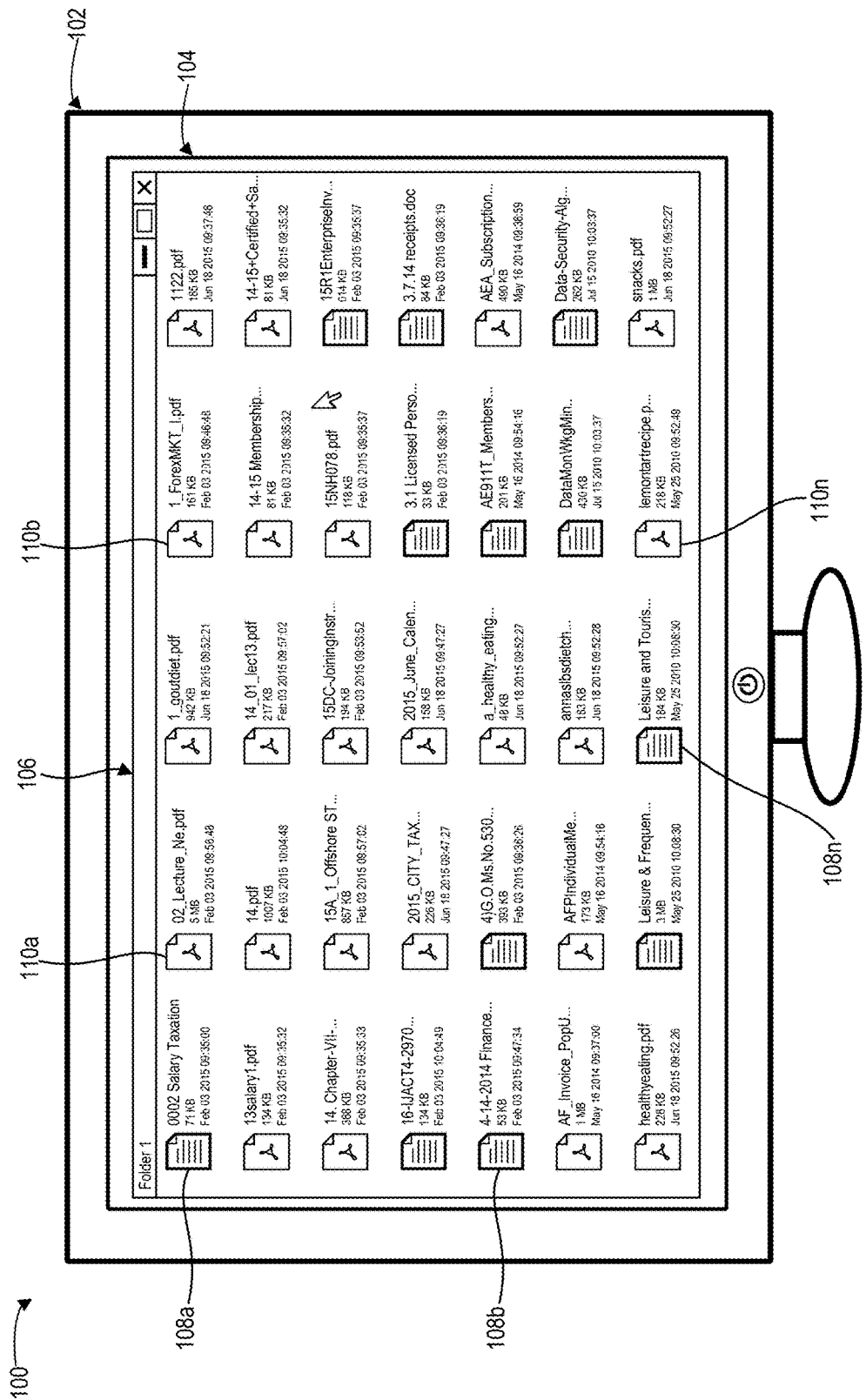
FIG. 1A illustrates a computing device displaying a digital folder with a plurality of default icons representing digital documents in accordance with one or more embodiments.

One or more embodiments of the present disclosure include a digital navigation system that selects and provides icons for digital documents based on topics associated with digital documents. For instance, in one or more embodiments the digital navigation system groups documents together, identifies topics from the groups of documents, and selects icons reflecting the identified topics. In this manner, the digital navigation system presents icons that reflect topics addressed by digital documents.

For example, in one or more embodiments the digital navigation system utilizes a clustering algorithm to generate a cluster of documents from a plurality of documents containing text. Moreover, the digital navigation system extracts topical phrases from the text of documents in the cluster of documents and identifies an icon based on the topical phrases. In addition, in one or more embodiments the digital navigation system provides the identified icon for display for each document in the cluster of documents.

By selecting icons based on topical phrases, the digital navigation system can increase speed of navigation with regard to a corpus of digital documents and decrease the time required to identify pertinent documents. For instance, in one or more embodiments, the digital navigation system applies a topical icon to a group of related documents to enable a user to more easily identify the group of related documents. Moreover, one or more embodiments of the digital navigation system provide topical icons for display together with other information related to digital documents. By presenting icons associated with topics of digital documents, users can utilize visual cues to more easily focus on a pertinent group of documents while utilizing other information (e.g., title or other information) to identify a particular document.

As mentioned, in one or more embodiments, the digital navigation system identifies groups of related documents. In particular, in one or more embodiments, the digital navigation system analyzes the text of digital documents in a digital folder and generates clusters based on the text. For example, the digital navigation system groups digital documents into a plurality of clusters containing documents with similar text utilizing a text-clustering algorithm. In this manner, the digital navigation system can divide a corpus of digital documents into document clusters containing similar digital documents.

Upon identifying clusters of documents, in one or more embodiments, the digital navigation system also identifies topical phrases. In particular, the digital navigation system extracts topical phrases from documents in a document cluster. For example, the digital navigation system extracts topical phrases representing significant phrases contained in the cluster of documents.

In some circumstances, topical phrases extracted from a set of specific, individual documents fail to encompass (at a sufficiently general level of abstraction) the variety of topics addressed in a cluster of documents. Accordingly, in one or more embodiments the digital navigation system generalizes the topical phrases. In particular, the digital navigation system can broaden one or more topical phrases from a cluster of documents to generate generalized terms or concepts. For example, the digital navigation system can generate generalized terms or concepts from topical phrases by utilizing a concept taxonomy.

Specifically, the digital navigation system utilizes a concept taxonomy to identify generalized terms that are broader than, but closely related to, topical phrases identified from a document cluster. For instance, in one or more embodiments, the digital navigation system maps topical phrases identified from a cluster of documents to corresponding terms within the concept taxonomy. In particular, the digital navigation system utilizes a concept taxonomy that organizes concepts into families and arranges concepts such that a distance within the concept taxonomy indicates a level of relatedness between concepts. In one or more embodiments, the digital navigation system analyzes families and distances within the concept taxonomy to identify generalized terms or concepts that are closely related to, and encompass, multiple topical phrases identified from a cluster of documents.

With clusters of similar documents and generalized terms or concepts associated with the clusters of documents, the digital navigation system identifies topical icons corresponding to clusters of similar documents. For instance, in one or more embodiments, the digital navigation system identifies icons by comparing generalized terms or concepts corresponding to a cluster of documents with description tags corresponding to one or more icons.

In particular, the digital navigation system converts generalized terms corresponding to a cluster of documents and description tags corresponding to one or more icons to digital values. The digital navigation system then compares the digital values to identify the icon(s) most similar to the generalized terms of concepts from the cluster of documents. Specifically, in one or more embodiments, the digital navigation system converts generalized terms or concepts to a generalized term vector and converts description tags for each icon to a tag vector. The digital navigation system utilizes a cosine similarity algorithm to compare the generalized term vector and the tag vector to identify the icon that most closely matches the generalized terms or concepts corresponding to the cluster of documents. In this manner, the digital navigation system identifies topical icons corresponding to clusters of documents within a corpus of digital documents (e.g., a digital folder).

Upon identifying topical icons corresponding to a cluster of documents, the digital navigation system can also modify the topical icons. For instance, in one or more embodiments, the digital navigation system modifies topical icons to provide additional visual cues corresponding to characteristics of a particular digital document. Specifically, in one or more embodiments, the digital navigation system applies an icon to a cluster of documents, but modifies each icon to present additional visual information regarding the unique characteristics of each individual digital document within the cluster of documents. For example, the digital navigation system modifies the color, size, shape, or texture of an icon based on the creation date, last-modified date, last-accessed date, size, or type of digital document.

Moreover, the digital navigation system can modify a topical icon to include another image (e.g., a smaller icon within an icon). For instance, in one or more embodiments, the digital navigation system applies a topical icon to a cluster of documents, and includes, within the topical icon, a visual indication of the type (e.g., format) of digital document. In this manner, the digital navigation system visually conveys both a topic corresponding to a digital document as well as a document type to enable a user to more easily and quickly navigate a corpus of digital documents.

In addition, in one or more embodiments, the digital navigation system assists a user in navigating to particular documents by controlling the number of document clusters (i.e., the number of icons) and/or the number of digital documents to include in the document clusters (i.e., the number of documents assigned to a particular icon). For instance, too few icons or too many icons increase the time required by a user to locate pertinent documents. Accordingly, the digital navigation system selects a number of document clusters (or a number of documents to include within a document cluster). The digital navigation system can select a number of document clusters based on a variety of factors, including, user input, a size of a corpus of documents (e.g., the number of digital documents in a digital folder), or user characteristics.

Moreover, as mentioned previously, the digital navigation system can further assist users in navigating digital files by generating context-specific icons (e.g., icons that are specific to topics addressed in a particular corpus of documents). For instance, the digital navigation system provides icons directed to more granular topics where a folder contains documents devoted to a single topic. Similarly, the digital navigation system provides icons directed to more general topics where a folder contains documents devoted to a broad range of topics.

Moreover, the digital navigation system updates and modifies icons as users update and modify documents in a digital file. For instance, in one or more embodiments, the digital navigation system assigns different icons to the same document as a result of changes to the document or surrounding documents over time. Indeed, the digital navigation system enables a user to more quickly identify groups of documents with respect to a corpus of documents, even where the corpus of documents changes over time.

As used herein, the term "document," or "digital document," refers to any form of electronic content containing text, regardless of form. For example, a digital document can include electronic files in the form of a word processing document, an image file, an e-mail file, a presentation file, a text file, a web page, or any other electronic file containing text. The term document or digital document includes, for example, documents with the file extension PDF, TXT, TTF, DOC, DOCX, WP, WPD, PPT, PPTX, XLS, XLSX, GIF, TIFF, IMG, JPEG, PNG, BMP, HTM, HTML, EML, EMLX, or SDM. In one or more embodiments, the digital navigation system can utilize optical character recognition technology (or similar technology) to convert images or other file types to text that can be utilized by the digital navigation system to identify topical icons.

As used herein, the term "cluster" refers to a group of digital documents. In particular, the term cluster includes a group of digital documents containing similar content. For instance, a cluster includes a group of digital documents identified by a text-based clustering algorithm. For example, a cluster includes a cluster of documents identified from a plurality of documents utilizing a blockclustering approach, K-means clustering, ToPMine topic modeling or other clustering algorithm.

As used herein, the term "icon" refers to a visual symbol whose form suggests a meaning. For instance, the term icon includes graphic symbols on a display screen that represent actions or objects. Moreover, the term icon includes a graphic symbol representing a quality, feature, characteristic, or topic.

As used herein, the term "topical phrase" refers to one or more words relating to a topic of one or more documents. For instance, the term "topical phrase" includes significant words extracted from one or more documents. A topical phrase may include a single word or a plurality of words. For instance, a topical phrase includes a plurality of adjacent words appearing in a digital document. In one or more embodiments, as described in greater detail below, the digital navigation system limits the number of words that may be included in a topical phrase (e.g., three words or less).

Figure 1B:
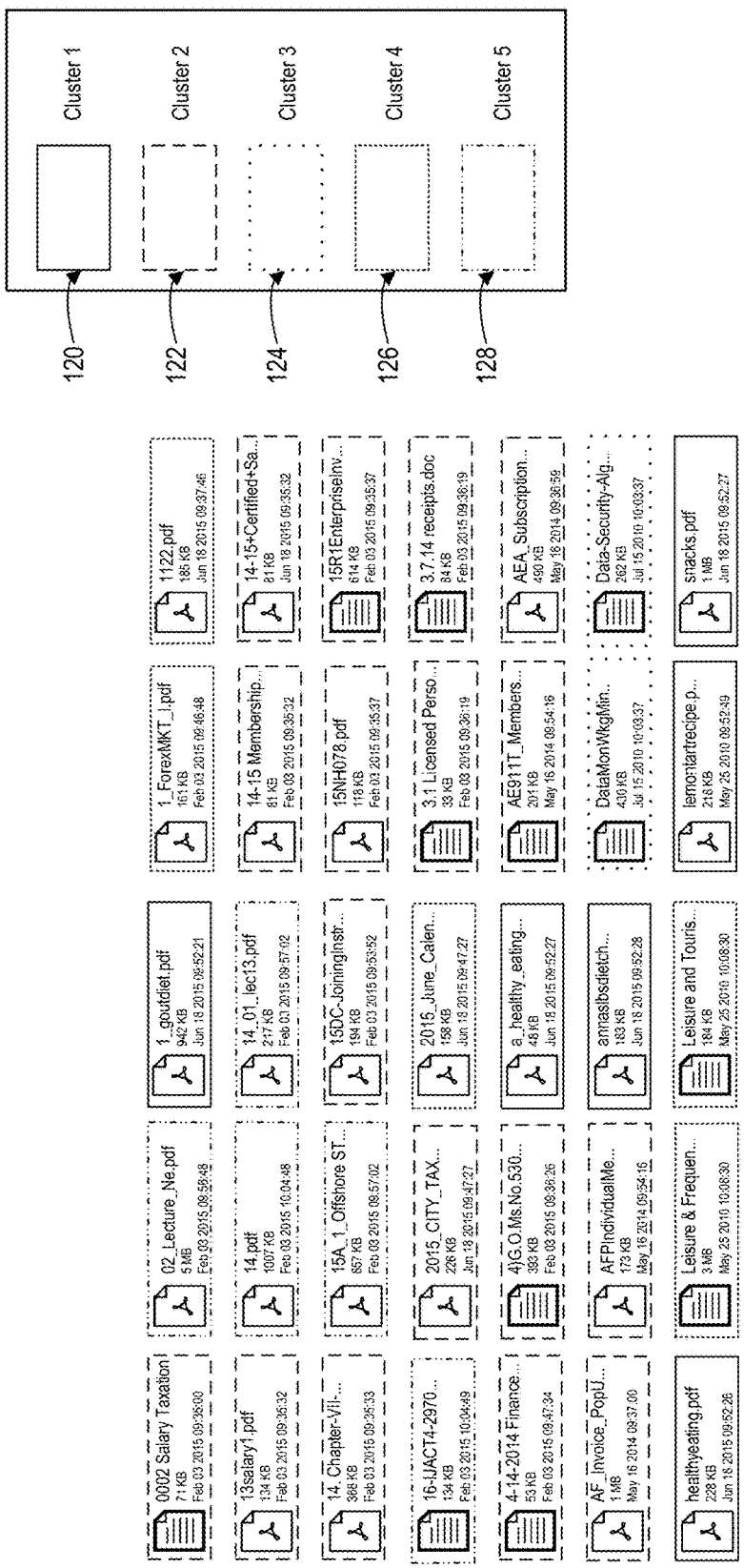
FIG. 1B illustrates representations of clusters of digital documents identified in accordance with one or more embodiments.

Turning now to FIGS. 1A-1B, additional detail is provided regarding operation of one or more embodiments of the digital navigation system. In particular, FIGS. 1A-1B illustrate generating a cluster of documents in accordance with one or more embodiments. Specifically, FIG. 1A illustrates a computing device 100 with a display device 102 having a screen 104. In particular, the screen 104 displays a user interface 106 containing a plurality of default icons representing digital documents. For instance, the user interface 106 displays word processing icons 108*a*-108*n* and PDF icons 110*a*-110*n* representing the type of documents underlying the icons. In alternative embodiments, the default icons can comprise a thumbnail image of the first page of the document with an optional indication of the type of file. The user interface 106 reflects the digital documents contained within a digital folder (i.e., "Folder 1").

As shown in FIG. 1A, the word processing icons 108*a*-108*n* and the PDF icons 110*a*-110*n* reflect a type of document (e.g., a document format) corresponding to the digital documents they represent. In particular, the word processing icons 108*a*-108*n* reflect word processing documents and the PDF icons 110a-110n reflect PDF documents. Accordingly, a user navigating the user interface 106 searching for a particular document can attempt to utilize the word processing icons 108a-108n and the PDF icons 110a-110n to visually identify particular documents.

As mentioned previously, however, one or more embodiments of the digital navigation system can generate icons reflecting the contents of the digital documents. In particular, the digital navigation system can organize digital documents into clusters of documents and apply topical icons to the clusters of documents. More specifically, the digital navigation system replaces the default icons with typical icons that reflect the general topic of the documents.

For example, FIG. 1B illustrates the default icons of FIG. 1A with representations of clusters generated by the digital navigation system. In particular, FIG. 1B illustrates a first cluster 120, a second cluster 122, a third cluster 124, a fourth cluster 126, and a fifth cluster 128. Specifically, the digital navigation system has grouped the digital documents illustrated in FIG. 1A into clusters of similar documents.

One or more embodiments of the digital navigation system identify clusters of documents by comparing the text of a plurality of documents. In particular, the digital navigation system compares the text of a plurality of documents to identify similar topics or phrases. Thus, with regard to FIG. 1B, the first cluster 120, the second cluster 122, the third cluster 124, the fourth cluster 126, and the fifth cluster 128 each contain documents with similar topics or words.

In one or more embodiments, the digital navigation system compares the text of documents and identifies clusters by utilizing a clustering algorithm. For instance, the embodiment illustrated in FIG. 1B utilizes a blockclustering algorithm to identify the clusters 120-128. Blockclustering is a co-clustering algorithm that clusters documents and phrases simultaneously and associates each document cluster with a unique phrase cluster. The digital navigation system can run the blockclustering algorithm with unigrams, bigrams, trigrams, or a combination thereof. With regard to FIG. 1B, the digital navigation system considers both unigrams and bigrams.

Although the particular embodiment of FIG. 1B utilizes blockclustering, in other embodiments, the digital navigation system utilizes alternative clustering algorithms. For instance, other embodiments of the digital navigation system utilize K-means clustering, ToPMine topic modeling, or other clustering algorithms. With regard to embodiments that utilize topic modeling, it will be appreciated that topic modeling algorithms provide a distribution of clusters (or topics) for each document. Accordingly, one or more embodiments of the digital navigation system that utilize topic modeling, obtain a clustering by assigning a document to its most dominant cluster.

One or more embodiments of the digital navigation system utilize an unsupervised clustering approach (i.e., an approach that clusters documents without pre-determined document categories). Indeed, the blockclustering, K-means clustering, and ToPMine modeling approaches discussed above can cluster documents based on textual similarities without pre-defined document topics or categories.

The unsupervised clustering approach permits the digital navigation system to adapt clusters based on the contents of a particular corpus of documents. For instance, utilizing an unsupervised cluster approach, the digital navigation system groups documents together based on the unique combination of documents and topics contained in a digital folder. For example, if a digital folder contains documents related to a single topic, such as medical documents, the digital navigation system will organize the documents into suitable subgroups that will help the user get a finer understanding of the documents in the digital folder.

Other embodiments of the digital navigation system utilize a supervised clustering approach (i.e., an approach that clusters documents into a set of pre-defined categories). For example, in one or more the digital navigation system identifies pre-defined categories, such as medical, finance, school, etc. Moreover, the digital navigation system creates clusters by grouping documents into the pre-defined categories. The supervised clustering approach permits the digital navigation system to produce more predictable clusters and icons. For instance, utilizing the supervised clustering approach the digital navigation system can develop user familiarity with particular clusters and categories.

As mentioned previously, in one or more embodiments the digital navigation system controls the number of clusters generated. In particular, the digital navigation system can control the number of clusters generated from a corpus of document (or the number of documents per cluster). For example, as illustrated in FIG. 1B, the digital navigation system generates five clusters of documents. In one or more embodiments, the digital navigation system generates less than five clusters (such as two clusters) or more than five clusters (such as ten clusters) of documents for a digital folder.

The digital navigation system can select a number of clusters to generate based on a variety of factors. For instance, in one or more embodiments, the digital navigation system selects a number of clusters based on one or more characteristics of the corpus of documents. In particular, the digital navigation systems select a number of clusters based on the number of documents in a corpus of documents. In one or more embodiments, the digital navigation system selects the number of clusters as a percentage of the number of documents in a digital folder (e.g., one cluster for every ten documents in a digital folder, or ten percent of the number of documents in the digital folder).

In addition to the number of documents in a corpus of documents, the digital navigation system can also select a number of clusters to generate based on other characteristics of a corpus of documents. For instance, in one or more embodiments, the digital navigation system considers the size (e.g., number of bytes or length) of digital documents, the type of digital documents, or the age of digital documents (e.g., time since creation or time since last access or modification). For example, if a digital folder contains very lengthy word processing files, the digital navigation system may include a greater number of icons (e.g., because each document may address a wide range of topics).

In addition to characteristics of a corpus of documents, the digital navigation system can also select a number of clusters based on one or more user characteristics. For example, the digital navigation system selects a number of clusters based on a user's age, demographic information, experience with computers, or other factors. For instance, the digital navigation system can determine that a user is elderly and has only rudimentary computer skills. In response, the digital navigation system can adjust the number of clusters (e.g., reduce the number of clusters to avoid confusing the user with too many icons).

Additionally, the digital navigation system optionally also adjusts a number of clusters based on user input. For instance, in one or more embodiments, the digital navigation system provides a user interface whereby a user can provide an indication of the number of clusters. Thus, the digital navigation system detects user input indicating that a user desires a particular number of clusters (e.g., ten clusters) and, in response, generate the specified number of clusters.

Moreover, as mentioned, the digital navigation system selects a number of documents per cluster. For instance, in one or more embodiments, the digital navigation system selects a maximum or minimum number of documents in one or more clusters. For example, in one or more embodiments, the digital navigation system requires that a cluster has at least two documents and no more than twenty documents. Similarly, the digital navigation system can require that a cluster have no more than a percentage of a corpus of documents (e.g., a cluster cannot contain more than twenty-five percent of documents within a digital folder).

Regardless of the number of documents or the number of clusters, upon identification of clusters of documents from a corpus of documents, the digital navigation system identifies topics associated with the clusters. In particular, in one or more embodiments, the digital navigation system extracts topical phrases from one or more clusters. For example, FIG. 2 illustrates a schematic representing how the digital navigation system extracts topical phrases from the first cluster 120 of FIG. 1B.

Figure 2:
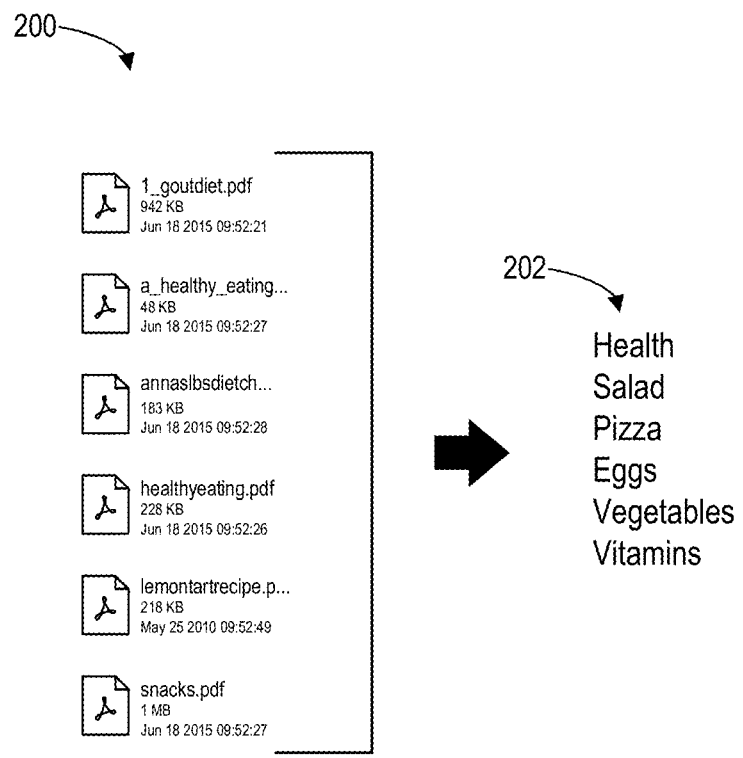
FIG. 2 illustrates a representation of extracting topical phrases from a cluster of digital documents in accordance with one or more embodiments.

In particular, FIG. 2 illustrates the digital navigation system the documents 200 of the first cluster 120. The digital navigation system identifies topical phrases or keywords 202 from the documents 200 of the first cluster 120. Specifically, as shown, the digital navigation system extracts the topical phrases health, salad, pizza, eggs, vegetables, and vitamins.

In one or more embodiments, the digital navigation system combines documents in a cluster into a combined reference. For instance, the digital navigation system creates the combined reference through the concatenation of its constituent documents. For example, with regard to FIG. 2, the digital navigation system creates the combined reference through the concatenation of text from the six documents included in the first cluster 120.

One or more embodiments of the digital navigation system identify topical phrases by analyzing the significance of each word or phrase in a cluster. For instance, in one or more embodiments, the digital navigation system calculates the significance of each word in the combined reference 200. More specifically, the digital navigation system calculates a significance score for each word or phrase from the combined reference 200 based on the statistical significance. Moreover, the digital navigation system selects topical phrases based on the score for each word or phrase.

In particular, in one or more embodiments the digital navigation system compares the significance score of each word or phrase to a significance score threshold (referred to herein as a significance score threshold, or $\beta$). For example, the digital navigation system can compare a significance score for a word in the combined reference 200 and determine if the significance score exceeds the significance score threshold. If the significance score of a particular word or phrase exceeds the significance score threshold (e.g., significance score is 30 and $\beta=25$), in one or more embodiments, the digital navigation system will identify the particular word as a potential topical phrase. If, however, the significance score of a particular word or phrase does not meet the significance score threshold (e.g., significance score is 20 and $\beta=25$), in one or more embodiments, the digital navigation system will not consider the particular word as a topical phrase.

In addition to applying a significance score threshold, in one or more embodiments, the digital navigation system also applies a minimum support count (referred to herein as a minimum support count, or $\theta$). In particular, in one or more embodiments, the digital navigation system determines the number of times that a particular word or phrase appears in a cluster of documents (or in a combined reference, such as the combined reference 200) and compares the number to a minimum support count. Specifically, if the number of times a particular word or phrase appears in the cluster of documents meets the minimum support count (e.g., a word appears 10 times and $\theta=5$), in one or more embodiments the digital navigation system will consider the word or phrase as a potential topical phrase. If the number of times a particular word or phrase appears in the cluster fails to satisfy the minimum support count (e.g., a word appears 2 times and $\theta=5$), in one or more embodiments the digital navigation system will not include the word or phrase as topical phrase.

Upon applying the significance score threshold ($\beta$) and the minimum support count ($\theta$), in one or more embodiments the digital navigation system ranks the remaining words and phrases and extracts a top scoring segment, $\alpha$, of the phrases. In one or more embodiments, the top scoring segment, $\alpha$, is a certain number of words phrases (e.g., the top two hundreds words or phrases upon sorting by significance score). In other embodiments, the top scoring segment, $\alpha$, is a certain percentage (e.g., the top five percent of words phrases upon sorting by significance score).

Regardless of the particular significance score threshold ($\beta$), minimum support count ($\theta$), or top scoring segment ($\alpha$), the navigation system can identify one or more topical phrases. In particular, in one or more embodiments, the digital navigation system utilizes a topic modeling algorithm to extract topical phrases in light of the significance threshold, minimum support count, and/or top scoring segment. More specifically, one or more embodiments utilize the topic modeling algorithm ToPMine to extract topical phrases from a cluster. ToPMine can generate a significance score, apply a significance score threshold, apply a minimum support count, and select a top scoring segment. Accordingly, in one or more embodiments, the digital navigation system utilizes ToPMine to obtain a list of significant phrases (e.g., topical phrases) for each cluster identified by the digital navigation system.

In addition to identifying topical phrases, in one or more embodiments, the digital navigation system controls the number of words that may appear in a topical phrase. For instance, in one or more embodiments, the digital navigation system places a maximum limitation on the number of words in a topical phrase (e.g., no more than three words). Other embodiments of the digital navigation system can place other limitations (e.g., no more than two words).

Moreover, although FIG. 2 illustrates generating topical phrases from the first cluster 120, it will be appreciated that the digital navigation system can generate topical phrases from other clusters, including the second cluster 122, the third cluster 124, the fourth cluster 126, and the fifth cluster 128. Indeed, one or more embodiments of the digital navigation system generate a set of topical phrases for each cluster identified by the digital navigation system from a corpus of documents.

As discussed above, upon identifying topical phrases associated with clusters of documents, one or more embodiments of the digital navigation system generalize the topical phrases. In particular, in one or more embodiments, the digital navigation system identifies generalized terms or concepts corresponding to topical phrases from a cluster of documents. More specifically, the digital navigation system utilizes a concept taxonomy to identify generalized terms or concepts corresponding to topical phrases.

As used herein, the term "concept taxonomy" refers to a classification of concepts or objects. In particular, the term concept taxonomy includes a thorough classification of concepts or objects particular to a domain of relevance. For example, one embodiment of a concept taxonomy includes the Wikipedia taxonomy.

A concept taxonomy can be represented as a directed acrylic graph (DAG), with concepts represented as nodes pointing to sub-concepts represented as child nodes. In this manner, concepts in a concept taxonomy can be classified into families (i.e., parent concepts that encompass child concepts represented by parent nodes pointing to child nodes). A parent node can have multiple child nodes and child nodes can have multiple parent nodes.

Figure 3:
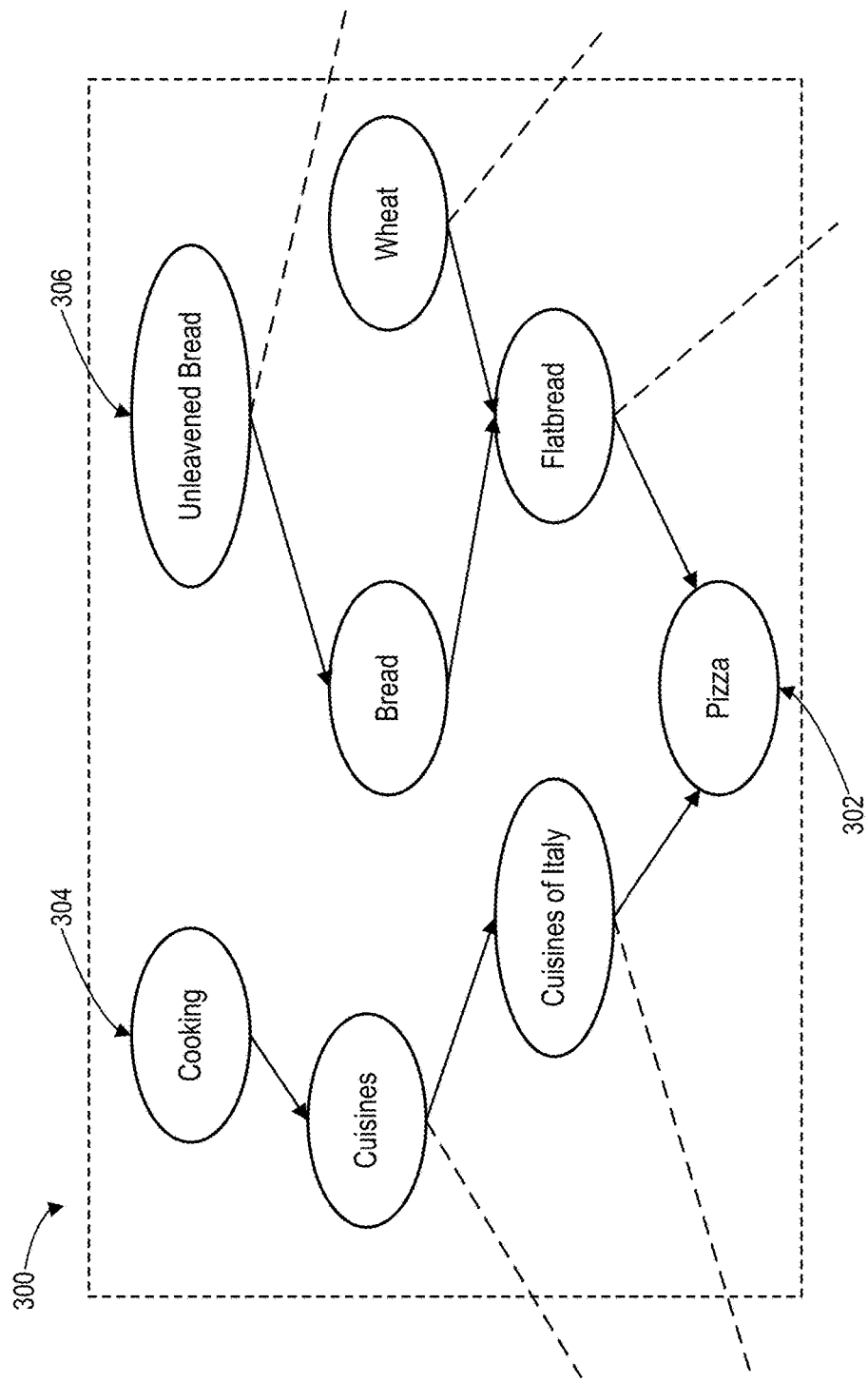
FIG. 3 illustrates a representation of generalizing topical phrases in accordance with one or more embodiments.

For example, FIG. 3 illustrates a representation of a portion of a concept taxonomy 300 in accordance with one or more embodiments. In particular, FIG. 3 illustrates a child node 302 labeled "Pizza" that has multiple parent nodes (e.g., broader, but related concepts) labeled "Cuisines of Italy" and "Flatbread." Similarly, FIG. 3 illustrates that the parent node "Cuisines of Italy" has multiple child nodes, including "Pizza" and "Pasta." Although the embodiment of FIG. 3 illustrates a portion of the Wikipedia taxonomy, it will be appreciated that other embodiments can utilize alternate concept taxonomies.

Notably, different levels of the concept taxonomy 300 indicate different levels of generality. In particular, the higher a node falls within the levels of the concept taxonomy 300 the more general the concept corresponding to the node. For instance, "Pizza" (a node on the lowest level) is more specific than its parent node, "Cuisines of Italy." Similarly, "Cuisines of Italy" is more specific than its parent node, "Cuisines." In addition, "Cuisines" is more specific than its parent node, "Cooking."

Thus, aside from illustrating families of related notes, nodes in a concept taxonomy can also reflect relatedness between one or more concepts. Indeed, as reflected in FIG. 3, a concept taxonomy can reflect relatedness based on a distance between one or more nodes (i.e., the number of levels between one or more nodes) in the concept taxonomy. Thus, the number of levels from another node within a family can indicate relatedness (e.g., a level of generality) between two terms.

One or more embodiments of the digital navigation system identify generalized terms or concepts for the documents in a cluster by applying topical phrases to the concept taxonomy. For instance, in one or more embodiments, the digital navigation system maps a topical phrase to a node (i.e., a "source node") within a concept taxonomy. For example, with regard to FIG. 3, the digital navigation system maps the topical phrase, "Pizza," from the topical phrases 202 to the corresponding source node 302 within the concept taxonomy 300.

The digital navigation system can map topical phrases to nodes within a concept taxonomy utilizing a variety of methods. For instance, one or more embodiments utilize exact string matching to map a topical phrase to a corresponding node in a concept taxonomy. Other embodiments utilize stemmed string matching to map a topical phrase to a concept taxonomy node.

In one or more embodiments, the digital navigation system maps each topical phrase for any given cluster of documents (e.g., all of the topical phrases 202) to a source node of a concept taxonomy (e.g., the concept taxonomy 300). Moreover, in one or more embodiments, the digital navigation system creates a graph of the parent nodes for each source node. Thus, although FIG. 3 illustrates a graph of the parent nodes for a particular topical phrase (i.e., pizza), in one or more embodiments, the digital navigation systems creates a graph of parent nodes for each topical phrase (e.g., all of the topical phrases 202).

Upon mapping topical phrases to concept taxonomy nodes (i.e., "source nodes"), in one or more embodiments, the digital navigation system analyzes parent nodes within the concept taxonomy to identify generalized terms or concepts related to the topical phrases (i.e., related to the source nodes). In particular, in one or more embodiments, the digital navigation system analyzes parent nodes of the source nodes to determine a number of source nodes within the same family of each parent node and the distance between each parent node and the source nodes within the same family. One or more embodiments of the digital navigation system utilize this information to select generalized terms or concepts that are closely related to (i.e. a short distance away from) the source nodes.

More specifically, one or more embodiments of the digital navigation system select generalized terms or concepts by calculating a generality score for parent nodes. In particular, the digital navigation system can identify a plurality of parent nodes within the same family as source nodes and calculate a generality score for each parent node in the plurality of parent nodes. The generality score can reflect the number of source nodes within the same family as each parent node as well as the distance between each parent node and the source nodes within the same family. Particularly, one or more embodiments of the digital navigation system calculates a generality score according to the following:

$$S_N = k \sum_{p \in P} \frac{1}{d(N, N_p)^\gamma}$$

where $S_N$ is the generality score for a particular parent node N; $N_p$ is the source node for topical phrase p in a list of topical phrases P; d is the distance (i.e., number of levels) between $N_p$ and parent node N; k is a constant of proportionality; and $\gamma$ is a variable penalty measure with regard to distance from $N_p$.

Notably, by calculating a generality score inversely proportional to the distance between a parent node and a source node, one or more embodiments of the digital navigation system assign higher scores to parent nodes that are closer to (i.e., fewer levels from) source nodes. In other words, by calculating a generality score inversely proportional to the distance between a parent and a source node, the digital navigation system emphasizes parent nodes that are more closely related to topical phrases.

Moreover, by summing generality scores for each parent node in the same family as a source node, in one or more embodiments the digital navigation system assigns higher scores to parent nodes within the same family as multiple source nodes. In other words, the digital navigation system can emphasize parent nodes that are related to multiple topical phrases.

For example, FIG. 3 illustrates a parent node 304 (entitled "Cooking"). With regard to the parent node 304, the digital navigation system calculates a generality score ($S_N$) in reference to the source node 302 (entitled "Pizza"). In particular, the distance (d) between the source node 302 and the parent node 304 is three (i.e., three levels between "Pizza" and "Cooking). Assuming a constant of proportionality (k) of one and a variable penalty measure ($\gamma$) of one, the generality score of the parent node 304 in reference to the parent node 304 is one-third, i.e., $$S_N = 1\left(\frac{1}{3^1}\right).$$

If the parent node 304 is in the same family as an additional source node, the digital navigation system can increase the generality score corresponding to the parent node 304. In particular, the digital navigation system can calculate the distance between the parent node 304 and the additional source node and increase the generality score. More specifically, if the additional source node is within three levels of the parent node 304, the digital navigation system can increase the generality score to two-thirds (i.e., one-third attributable to the source node 302 and one-third attributable to the additional source node).

In addition to calculating a generality score with regard to the parent node 304, the digital navigation system can also calculate a generality score for additional parent nodes. For instance, the digital navigation system can also calculate a generality score for the parent node 306 or any other parent node in the concept taxonomy 300. In one or more embodiments, the digital navigation system calculates a generality score for the parent nodes of all source nodes (e.g., parent nodes for all nodes corresponding to the topical phrases 202). In other embodiments, the digital navigation system calculates a generality score only for certain parent nodes (e.g., parent nodes within thirteen levels of a source node).

As expressed above, one or more embodiments of the digital navigation system utilizes a constant of proportionality (k) to convert a raw similarity score to a more consistent similarity measure. The constant of proportionality can vary depending on the desired similarity measure and the particular embodiment. As mentioned above, in one or more embodiments, the digital navigation system does not utilize the constant of proportionality (i.e., the constant of proportionality is set to a value of one).

Similarly, one or more embodiments of the digital navigation system utilize the variable penalty measure ($\gamma$) to modify the amount of emphasis placed on the distance between nodes in calculating the similarity score. In particular, increasing the variable penalty measure places an increased emphasis on the distance between a particular node and a source node. Similarly, decreasing the variable penalty measure places decreased emphasize on the distance between a particular node and a source node. Thus, by increasing the variable penalty measure the digital navigation system can identify generality terms closer to (i.e., more specific to and more related to) source nodes. Conversely, by decreasing the variable penalty measure, the digital navigation system can identify generality terms further from (i.e., more general and more broad than) source nodes.

The digital navigation system can select (or modify) the variable penalty measure based on a variety of factors. For instance, the digital navigation system can modify the variable penalty measure based on the number of documents in a corpus of documents, a number of clusters, a number of documents in one or more clusters, or user input. For example, the digital navigation system can determine that a cluster contains a relatively small number of documents (e.g., two documents), and increase the variable penalty measure (e.g., to select generalized terms that are more specific to the concepts addressed in the small number of documents). Similarly, the digital navigation system can determine that a small number of clusters exist in a corpus of documents (e.g. two clusters) and decrease the variable penalty measure (e.g., because there is little chance of icon overlap with two clusters and a larger chance that the clusters address a diversity of topics).

As mentioned previously, one or more embodiments select generalized terms or concepts utilizing generality scores applicable to parent nodes. In particular, in one or more embodiments, the digital navigation system ranks parent nodes according to their generality scores. Moreover, in one or more embodiments the digital navigation system selects generalized terms or concepts utilizing the highest-ranking parent nodes.

The number of generalized terms selected by the digital navigation system can vary from embodiment to embodiment. For example, in one or more embodiments the digital navigation system selects a pre-defined number of generalized terms (e.g., the digital navigation system selects parent nodes with the top five generality scores). In other embodiments, the digital navigation system selects a certain percentage of generalized terms (e.g., the parent nodes with the top one percent of generality scores). In yet other embodiments, the digital navigation system applies a threshold generality score to select generality terms (e.g., the digital navigation system selects all parent nodes with generality scores exceeding a threshold generality score).

As mentioned previously, one or more embodiments of the digital navigation system utilize generalized terms or concepts to identify icons corresponding a cluster of documents. For instance, in one or more embodiments, the digital navigation system compares icons and generalized terms or concepts corresponding to a cluster of documents to identify icons corresponding to topics addressed by the cluster. In particular, in one or more embodiments, the digital navigation system accesses a plurality of icons and a plurality of description tags corresponding to the plurality icons and compares the description tags to the generalized terms or concepts. More specifically, in one or more embodiments, the digital navigation system converts description tags corresponding to icons to digital values (e.g., tag vectors) and converts generalized concepts to digital values (e.g., generalized concepts vectors (also referred herein as generalized term vectors)) and compares the digital values (e.g., utilizing cosine similarity) to identify an icon that is most similar to the generalized terms.

Figure 4:
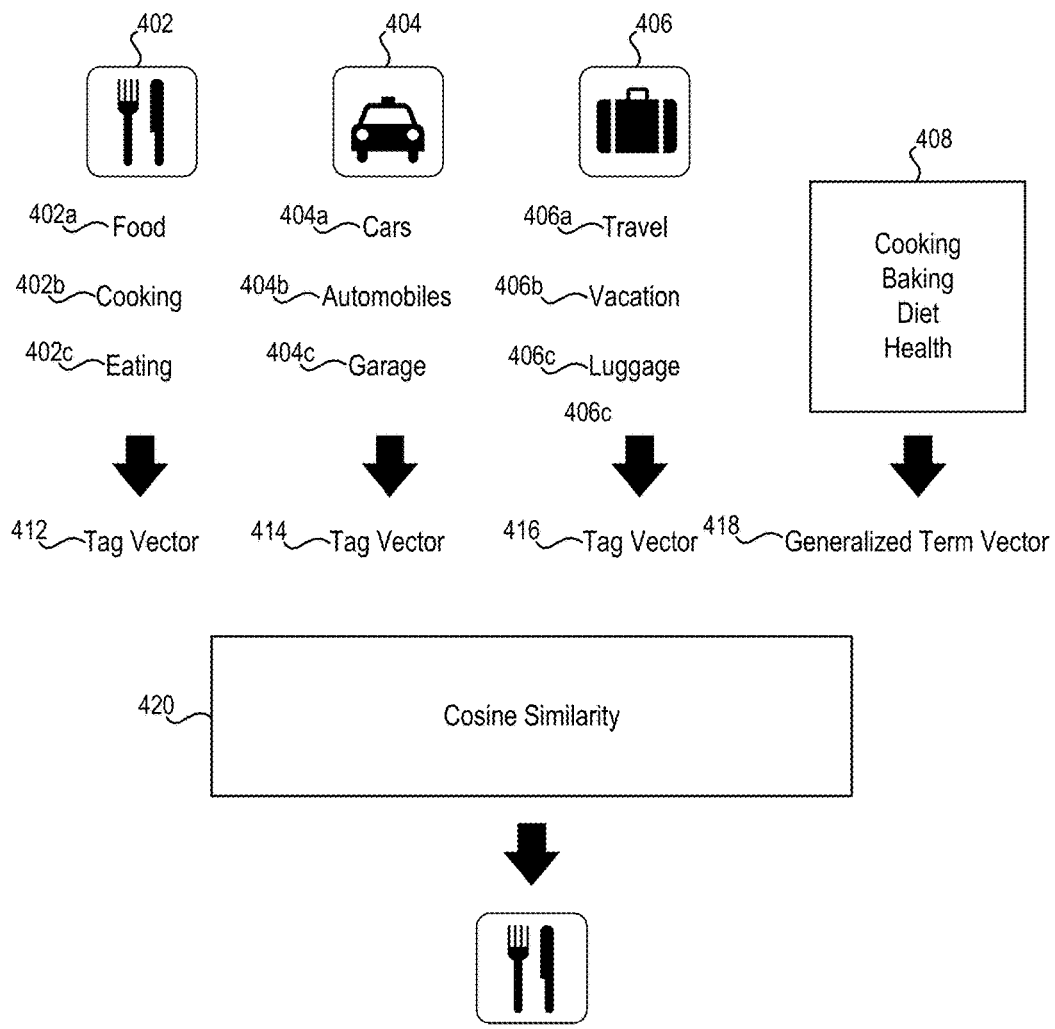
FIG. 4 illustrates a representation of selecting an icon in accordance with one or more embodiments.

For example, FIG. 4 illustrates a schematic representation of the digital navigation system identifying icons corresponding to a cluster of documents in accordance with one or more embodiments. In particular, FIG. 4 illustrates a food icon 402, a car icon 404, and a luggage icon 406, each with corresponding description tags 402a-402c, 404a-404c, and 406a-406c. For instance, the food icon 402 corresponds to a food tag 402a, a cooking tag 402b, and an eating tag 402c.

Although FIG. 4 illustrates only three icons each corresponding to three description tags, it will be appreciated that the digital navigation system can access or generate a greater number of icons with a greater number of description tags. Indeed, in one or more embodiments the digital navigation system can access (or generate) a repository of icons with tens of thousands of icons, each icon having (on average) more than five description tags.

Aside from icons and description tags, FIG. 4 also illustrates generalized terms or concepts 408. The digital navigation system identifies the generalized terms 408 utilizing the concept taxonomy 300 of FIG. 3 and the topical phrases 202 of FIG. 2. In particular, the digital navigation system generalized the topical phrases 202 (i.e., "Health," "Salad,"

"Pizza," "Eggs," "Vegetables," and "Vitamins") utilizing the concept taxonomy 300 to obtain the generalized terms 408 ("Cooking," "Diet," and "Health").

As mentioned previously, one or more embodiments of the digital navigation system convert description tags to tag vectors and generalized terms to a generalized term vector and computes a cosine similarity between each of the tag vectors and the generalized term vector. Moreover, in one or more embodiments, the digital navigation system can select an icon most similar to the generalized terms based on the tag vectors and the generalized term vector.

In particular, in one or more embodiments, the digital navigation system assigns a particular icon, $i_c$, to a cluster, c, by creating a vector, $gp_c$, of the generalized terms 408. Also, for each icon, i, from an icon repository, I (e.g., icons 402-406), the digital navigation system creates a tag vector $t_i$ reflecting the tags for each icon. The digital navigation system computes a cosine similarity between $gp_c$ and each $t_i$ and selects the icon with the highest cosine similarity with $gp_c$, as expressed by the following:

$$i_c = \arg_{i \in I} \max \cos(gp_c, t_i)$$

One or more embodiments of the digital navigation system generate vectors and calculate cosine similarities utilizing one or more word to vector algorithms. For instance, one or more embodiments utilize the Google Word2Vec tool.

For example, FIG. 4 illustrates a representation of converting the tags 402a-402c, 404a-404c, 406a-406c and the generalized terms 408 to tag vectors 412-416 and generalized term vector 418. Moreover, FIG. 4 illustrates application of a cosine similarity 420 between the tag vectors 412-416 and the generalized term vector 418 resulting in generation of an icon most similar to the generalized terms 408.

FIG. 4 illustrates a representation of the digital navigation system selecting a single icon with regard to generalized terms corresponding to a single cluster of documents. The digital navigation system can select icons with regard to additional clusters of documents. Indeed, in one or more embodiments, the digital navigation system selects icons with regard to generalized terms corresponding to each cluster of documents identified from a corpus of documents. In this manner, the digital navigation system can identify icons that correspond to topics in a plurality of digital documents.

In additional, it will be appreciated that although FIG. 4 illustrates three description tags corresponding to each icon 402-406 and three generalized terms 408, the relative number of description tags and generalized terms can vary. For instance, in one or more embodiments, the digital navigation system can compare hundreds of icons, each comprising varying numbers of description tags, to dozens of generalized terms.

Figure 5A:
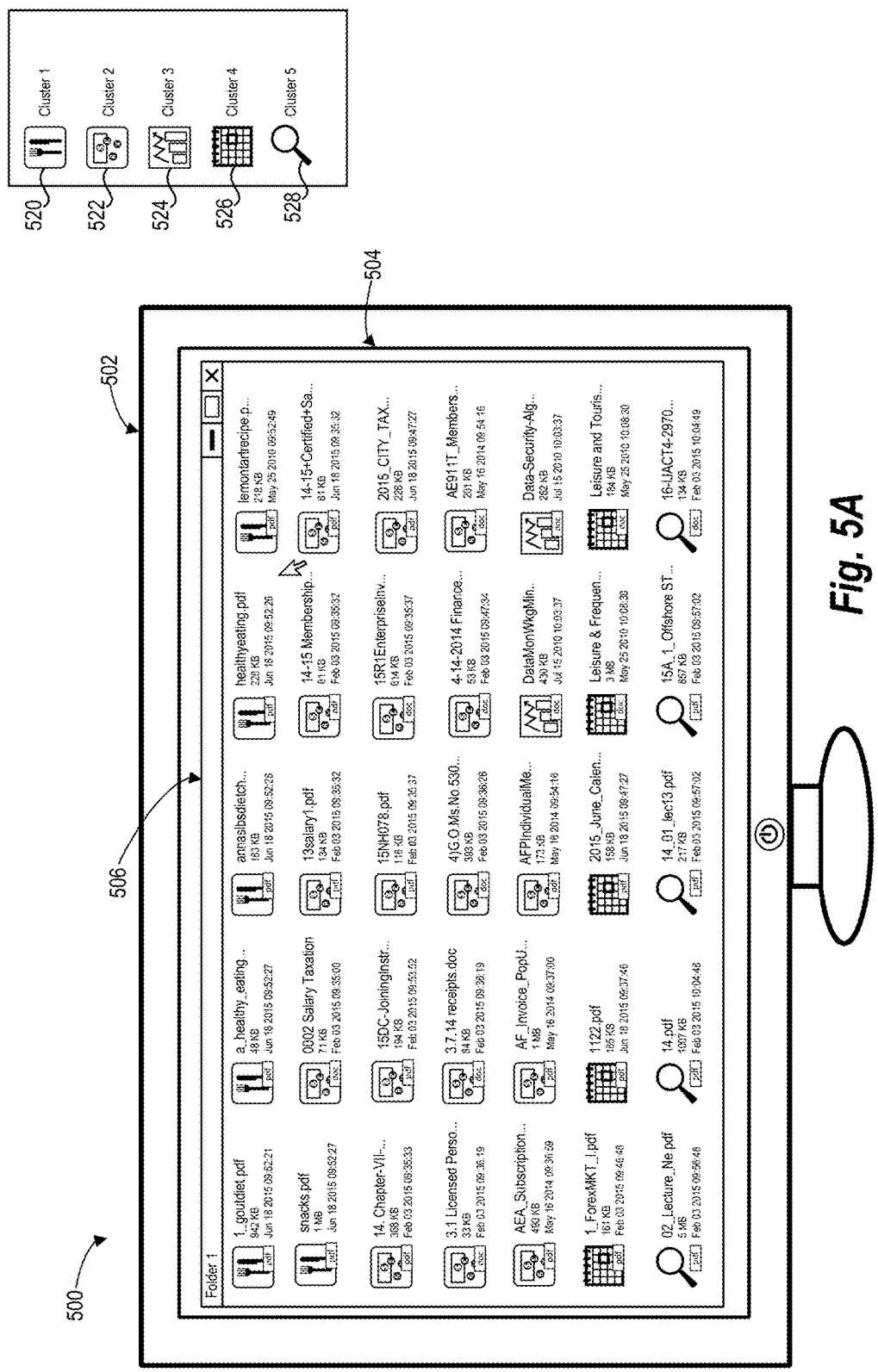
FIG. 5A illustrates a computing device displaying a digital folder with icons corresponding to topics of digital documents in accordance with one or more embodiments.

Upon identifying icons corresponding to clusters of documents, the digital navigation system can present the icons for display. In particular, the digital navigation system can present the icons together with other information corresponding to digital documents. For instance, FIG. 5A illustrates a computing device 500 with a display device 502 and screen 504 displaying a user interface 506 containing a plurality of icons, each representing a digital document.

In particular, FIG. 5 illustrates icons corresponding to the clusters 120-128 identified with regard to FIG. 1B. Specifically, the digital navigation system applies a food icon 520 to the first cluster 120, a money icon 522 to the second cluster 122, a data icon 524 to the third cluster 124, a calendar icon 526 to the fourth cluster 126, and a search icon 528 to the fifth cluster 128. As described above, utilizing topical phrases (and generalized terms) the digital navigation system identifies the icons 520-528 corresponding to the clusters 120-128. Moreover, as illustrated, the digital navigation system presents the icons 520-528 for display with regard to each corresponding cluster and each corresponding digital document. Thus, for example, the digital navigation system identified the document entitled "1_goutdiet.pdf" as part of the first cluster 120, and, accordingly, the digital navigation system in FIG. 5 displays a representation of the digital document entitled "1_goutdiet.pdf" with the icon 520 corresponding to the first cluster 120.

As mentioned previously, in one or more embodiments, the digital navigation system can also modify topical icons. For instance, the digital navigation system can modify icons to illustrate additional characteristics of one or more digital documents. For example, with regard to FIG. 5, the digital navigation system modifies the icons 520-528 to include a graphical representation of a type of digital document. For instance, each of the food icons 520 in the user interface 506 includes a graphical symbol identifying each digital document is a particular type of file (i.e., a PDF file). Similarly, other icons include graphical symbols identifying digital documents that are other types of files (i.e., DOC files or other files).

Figure 5B:
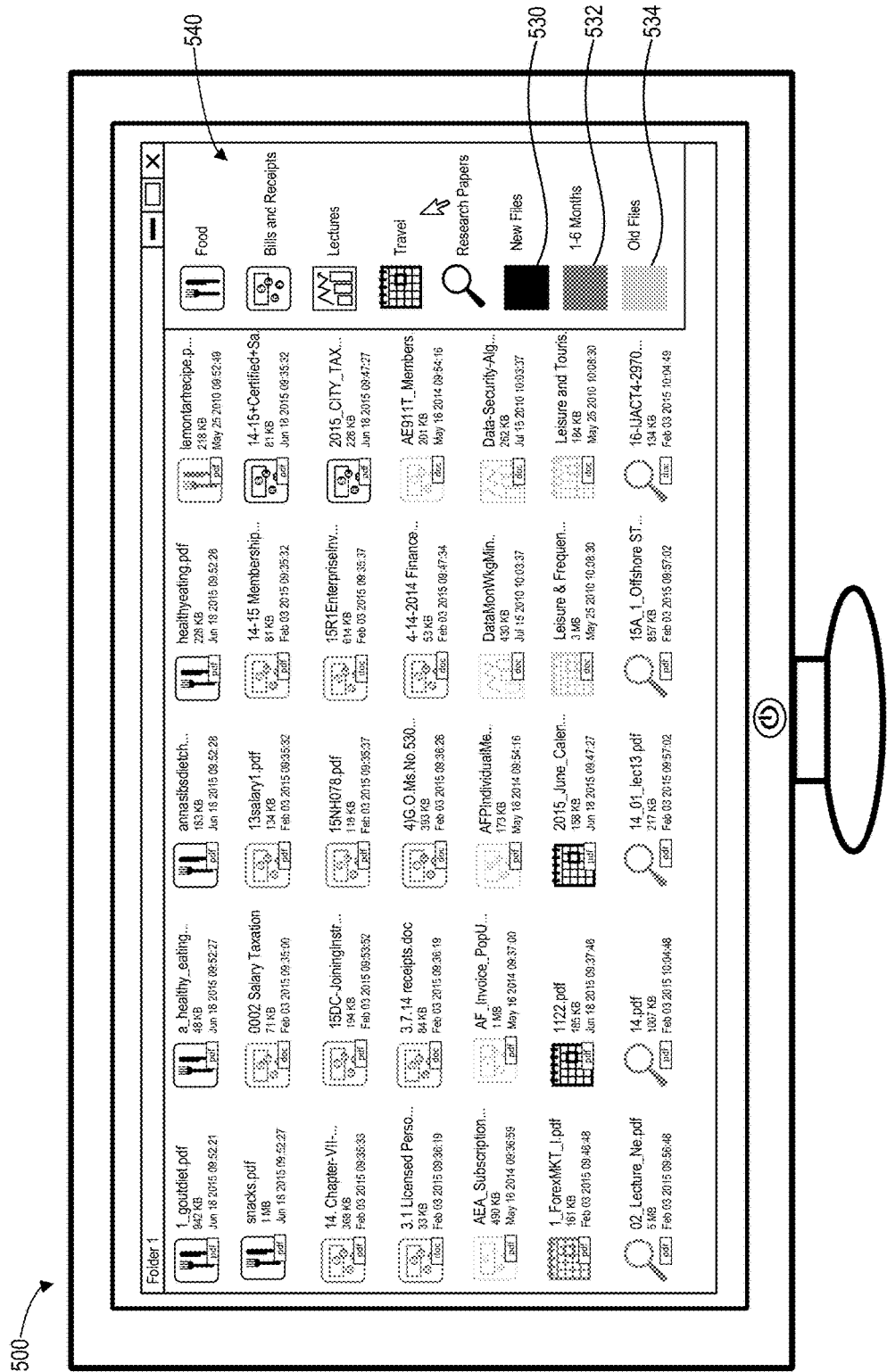
FIG. 5B illustrates a computing device displaying a digital folder with modified icons in accordance with one or more embodiments.

Aside from adding images or icons indicating a document type, the digital navigation system can modify icons in a variety of ways. For example, as illustrated in FIG. 5B, the digital navigation system can modify the color or shade of an icon. In particular, FIG. 5B illustrates a plurality of icons with colors modified to reflect the last-access date of each digital document (e.g., the time since the date each digital document was accessed). Specifically, the digital navigation system utilizes a first color 530 to illustrate new files (e.g., files last accessed within one month), a second color 532 to illustrate files accessed between one and six months, and a third color 534 to illustrate old files (e.g., files last accessed more than six months ago). Thus, the digital navigation system can modify the color or shade of icons to provide a visual representation of the time each digital document was last accessed.

Aside from color or shade, the digital navigation system can modify one or more topical icons in a variety of additional ways. For instance, the digital navigation system can modify the size, shape, texture, clarity, transparency, orientation, or appearance of one or more icons. Thus, rather than altering color to indicate age, in one or more embodiments, the digital navigation system can otherwise alter the appearance of one or more icons (e.g., add an image of cobwebs or make the icon appear more transparent).

Moreover, in addition to age or file type, the digital navigation system can also modify icons to reflect a variety of additional document characteristics. For instance, the digital navigation system can modify one or more icons based on document size, document source, document creation date, document last-accessed date (i.e., the date or time a document was last accessed by a user), document last-modified date (i.e., the date or time a document was last modified), or document name. Thus, for example, the digital navigation system modifies the size of an icon based on the size of a digital document file (e.g., the larger the digital document file in bytes the larger the icon).

Although specific examples of modifications have been provided with regard to specific digital document characteristics. It will be appreciated that the digital navigation system can utilize other combinations of characteristics and visual modifications. For instance, the digital navigation system can modify the color or transparency of a document based on the last-accessed date. It will be appreciated that the digital navigation system can modify icons in any of the ways discussed above with regard to any characteristic of a digital document (utilizing any combination).

In addition to modifying icons, as illustrated in FIGS. 5A and 5B, the digital navigation system can also sort or arrange digital documents. In particular, the digital navigation system can sort or arrange digital documents based on assigned icons. For instance, in FIG. 5B the digital navigation system has arranged representations of digital documents so that digital documents corresponding to the food icon 502 (and other icons) are grouped together. The digital navigation system can sort icons in a variety of arrangements. For instance, the digital navigation system can arrange icons according to topic, file type, size, age, date of access, or some other characteristics.

Notably, the digital navigation system is not limited to sorting only along one dimension (like name, file type, access time, or size); rather, by utilizing icons, the digital navigation system can perform nested sorting to reduce a user's file search space substantially. For example, as illustrated in FIG. 5B, sorting files first by last-accessed date and then by topical icon leads to files being sorted by category (all similar icons appear contiguously), and within each category, according to the time of access (all icons of a particular type with the same shade appear contiguously). Thus, using visual cues provided by the digital navigation system, a user can quickly focus to a particular topic and identify the most recently accessed documents.

Furthermore, in one or more embodiments, the digital navigation system can also provide for display information regarding one or more icons. For instance, in one or more embodiments the digital navigation system can provide a legend that clarifies the meaning of one or more icons or modifications (e.g., a topic corresponding to a cluster of documents having a particular icon). For example, FIG. 5B includes a legend 540 containing visual representations of icons together with text corresponding to a topic associated with each icon (or cluster of documents associated with each icon).

Moreover, the digital navigation system can also provide icons in conjunction with other information corresponding to a digital document. For example, as illustrated in FIGS. 5A-5B, the digital navigation system provides information regarding title, size, or date of creation in conjunction with an icon for each digital document. In other embodiments, the digital navigation system provides additional textual information regarding file type, last access date, or other information.

It will be appreciated that although the examples and illustrations provided above with regard to FIGS. 1-5B have utilized a particular corpus of documents (e.g., a user interface illustrating digital documents a single digital folder), the digital navigation system can identify a corpus of documents from a variety of sources. For instance, rather than utilizing a corpus of documents in a single digital folder, in one or more embodiments, the digital navigation system can identify a corpus of documents from a plurality of digital folders.

For example, in one or more embodiments, the digital navigation system accesses a digital parent folder containing digital sub-folders. In one or more embodiments, the digital navigation system can identify icons utilizing documents from both the digital parent folder and the digital sub-folders. For instance, the digital navigation system identifies a corpus of documents that includes all of the documents in both the digital parent folder and the digital sub-folders. Thus, for example, the digital navigation system identifies clusters and icons based on documents residing both in the digital parent folder and the sub-folders.

In such embodiments, all of the documents assigned to a particular cluster may not reside in the same digital folder (e.g., some documents in a cluster may reside in the parent digital folder and other documents in a cluster reside in a sub-folder). In one or more embodiments, the digital navigation system applies the same icon to each document in the cluster but displays icons corresponding to such documents with regard to the digital folder in which each document resides (e.g., for display purposes, leaves the documents that reside in the parent digital folder in the parent digital folder and the documents that reside in the sub-folder in the sub-folder). In other embodiments, the digital navigation system displays all documents in a particular cluster with regard to a single digital folder, even though the documents may reside (i.e., be stored electronically) in different digital folders.

In yet other embodiments, the digital navigation system accesses a digital parent folder containing digital sub-folders and treats the sub-folder separately from the digital folder. For instance, in one or more embodiments, the digital navigation system can generate icons with regard to digital documents contained in the digital parent folder without analyzing documents contained in the digital sub-folders.

Moreover, in one or more embodiments, the digital navigation system selects and applies one or more topical icons to a digital folder itself. For example, in a circumstance where a digital parent folder contains digital sub-folders, in one or more embodiments, the digital navigation system can select and apply a topical icon with regard to the digital sub-folder. Specifically, in one or more embodiments, the digital navigation system treats all documents in the digital sub-folder as a cluster, identifies topical phrases, and ultimately selects an icon applicable to the topics addressed by the documents in the digital sub-folder. Moreover, the digital navigation system can modify the icon to indicate that the icon corresponds to a digital folder (e.g., display the topical icon as part of a folder icon).

Aside from identifying a corpus of documents from digital parent folders and sub-folders, the digital navigation system can also identify a corpus of documents from other sources or locations. For instance, in one or more embodiments, the digital navigation system can identify a corpus of documents based on user input. For instance, a user can select a plurality of folders, a plurality of documents, or both, and the digital navigation system can apply icons to all selected documents.

Moreover, the digital navigation system can also identify a corpus of documents from a sub-set of a larger collection of documents. For instance, rather than considering all documents in a digital folder in selecting and applying icons, one or more embodiments only considers a subset of documents from a digital folder. For instance, the digital navigation system can exclude documents based on user input (e.g., a user specifies certain files not to include), file type (e.g., files not typically utilized by a user for storing and retrieving information, such as EXE files), date of creation, last access date, or size (e.g., omit digital documents less than 2 kb).

In addition to identifying a corpus of documents, in some embodiments, the digital navigation system also considers and accounts for modifications to digital documents (or modifications to a corpus of digital documents). For instance, it will be appreciated that a user can create, change, modify, or move digital documents (or a corpus of digital documents). Accordingly, in one or more embodiments, the digital navigation system can modify icons to reflect such changes.

For example, if a user modifies the contents of a digital document to remove text with regard to a first topic and to add new text with regard to a second topic, the digital navigation system can account for the modifications. Specifically, in one or more embodiments, the digital navigation system determines clusters based on the new text with regard to the second topic, identifies additional topical phrases, and applies a new icon based on the new text with regard to the second topic.

Similarly, if a user moves a digital document from a first digital folder (with a first set of documents) to a second digital folder (with a second set of documents), the digital navigation system can modify one or more icons to reflect the modification. For instance, the digital navigation system can identify clusters from the second set of documents (including the moved digital document), identify topical phrases, and select appropriate icons corresponding to topics associated with each identified cluster. Thus, upon a user moving a digital document from a first folder to a second folder, the digital navigation system may change a first icon associated with the digital document to a second icon associated with the digital document, based on the corpus of digital documents in the second folder.

The digital navigation system can accommodate similar modifications to a corpus of documents. For instance, a user may delete certain digital files, move documents from a sub-folder to a parent folder, or otherwise modify a corpus of documents. The digital navigation system can identify clusters and icons with regard to the modified corpus of documents. Thus, the digital navigation system can modify icons particular to a changing corpus of documents to enable a user to more easily navigate the corpus of documents as it changes.

To illustrate one or more advantages of the digital navigation system, experimenters have conducted research to show that the digital navigation system speeds up document file navigation. In particular, experimenters have tested three different scenarios: (1) a system without topical icons, but utilizing icons reflecting file type (e.g. a PDF icon for a PDF document); (2) a system utilizing topical icons (e.g., as illustrated in FIG. 5A); and (3) a system utilizing topical icons with where the color of the topical icons modified to reflect document age (e.g., as illustrated in FIG. 5B). Experimenters utilized a document repository of 10,000 public documents of a variety of different categories. Moreover, experimenters utilized over 35,000 tagged icons from an icon repository. In addition, experimenters utilized the comprehensive Wikipedia taxonomy for generalizing topical phrases.

Experimenters identified a group of users and presented questions for which the users had to locate a unique file from a corpus of 60 documents. For instance:

"Your cook is not coming today. So you want to make some tasty brunch by following the Mr. Food eCook-Books recipe that your mother gave you last year. Find the document containing the recipe."

Experimenters utilized a total of 30 such questions that subjects had to solve in each of the three scenarios. For each (question, scenario) pair, experimenters sought six annotations, resulting in a total of 30 (questions)×3 (scenarios)×6 (annotations)=540 annotations. Each user was asked to complete nine such (question, scenario) pairs to allow for familiarization with the new interface. Experimenters thus required 540/9=60 human annotators. To avoid familiarity with the corpus, annotators were not allowed to solve the same question in more than one scenario. Users were provided with a legend (similar to the legend 540) to map the document category to the icon. The orders in which the scenarios were presented to the annotators were randomized.

For phrase extraction, experimenters utilized algorithm ToPMine, with $\alpha=100$, $\beta=25$, and $\theta=5$. Moreover, the maximum n-gram was selected at three (i.e., only unigrams, bigrams, and trigrams were considered). In addition, experimenters utilized the following values for the constant of proportionality, the penalty factor, and the portion of top scoring node labels:

$k=1$; $\gamma=5$; and $\alpha=25$

Experimenters measured the file navigation times, and the numbers of file opens, file hovers, and screen scrolls across the three scenarios in a controlled laboratory setup as well as a crowdsourced Amazon Mechanical Turk (AMT) setup. These four parameters indicate the difficulty of finding a file. The results are illustrated in Table 1.

TABLE 1

Results on file navigation efficiency in lab and AMT setups

| Setup | Scenario | Time Taken (s) | Scrolls | Files Opened | File Hovers |
|---|---|---|---|---|---|
| Lab | Current | 100.00 | 19.02 | 1.46 | 12.30 |
|  | Topical Only | 77.86 | 11.18 | 1.68 | 11.60 |
|  | Topical + Time | 73.47 | 10.18 | 1.12 | 8.82 |
| AMT | Current | 98.04 | 15.56 | 1.97 | 11.34 |
|  | Topical Only | 89.72 | 13.68 | 1.45 | 9.53 |
|  | Topical + Time | 92.24 | 13.00 | 1.62 | 10.15 |

As illustrated in Table 1, for both setups, there is a decrease in file finding time from Scenario 1 to 2 (by about 22 seconds and 9 seconds for lab and AMT respectively), thus proving that utilizing of icons in accordance with one or more embodiments is useful in reducing navigation times. The "Topical+Time" scenario shows the best efficiency (minimum values) in all four metrics in the lab setup, while "Topical" was preferred in AMT.

Figure 6:
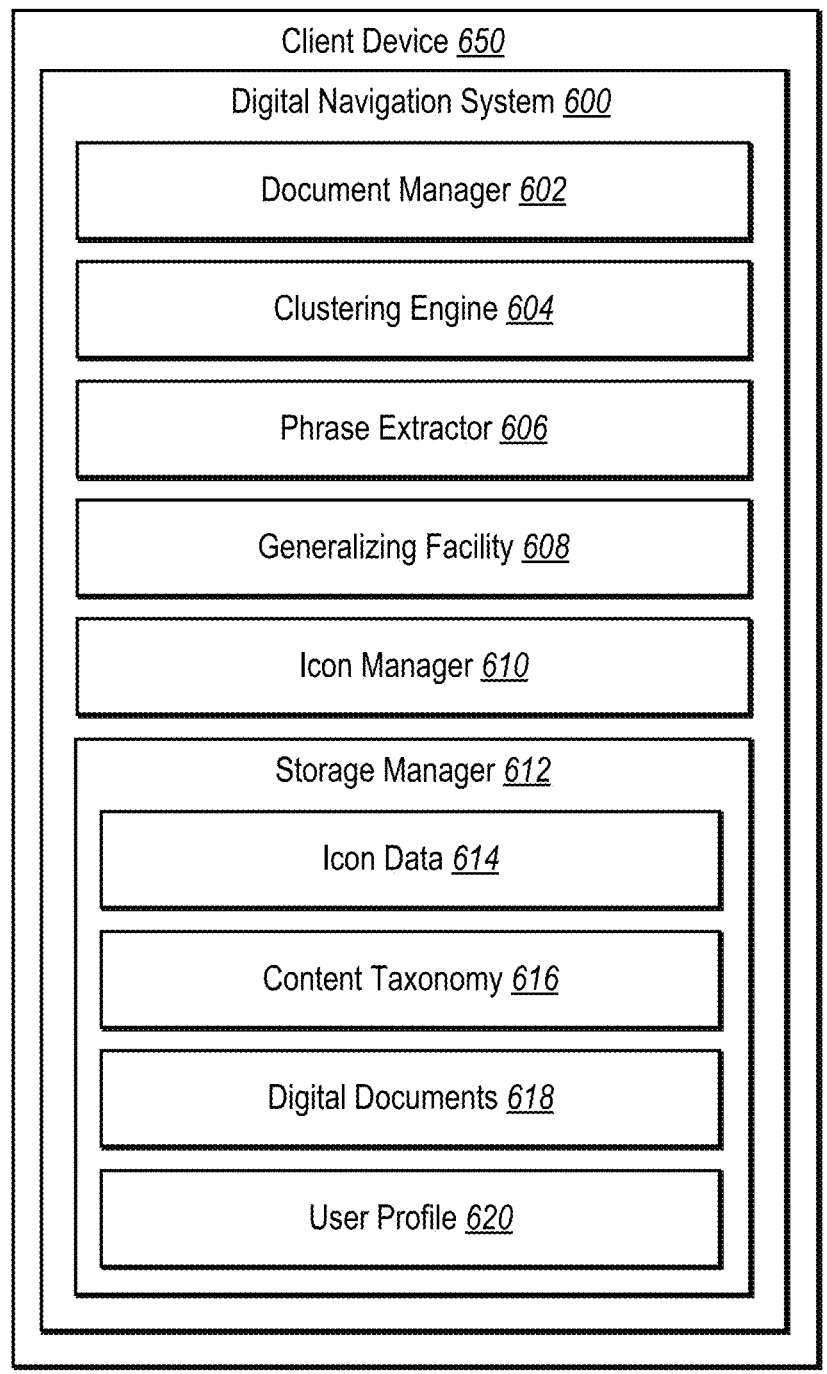
FIG. 6 illustrates a schematic diagram of a digital navigation system in accordance with one or more embodiments.

Turning now to FIG. 6, additional detail will be provided regarding components and capabilities of one embodiment of the digital navigation system. In particular, FIG. 6 illustrates an embodiment of an exemplary digital navigation system 600 (e.g., the digital navigation system, discussed above) on a client device 650. As shown, the digital navigation system 600 may include, but is not limited to, a document manager 602, a clustering engine 604, a phrase extractor 606, a generalizing facility 608, an icon manager 610, and a storage manager 612. Moreover, the storage manager 612 may include icon data 614, concept taxonomy 616, digital documents 618, and user profile 620.

As just mentioned, and as illustrated in FIG. 6, the digital navigation system 600 include the document manager 602. In one or more embodiments, the document manager 602 accesses, obtains, gathers, identifies, selects, and provides digital documents. For instance, the document manager 602 can access digital documents stored in one or more digital folders.

The document manager 602 obtains digital documents from any available source or location. For example, the document manager 602 accesses documents stored on a client device, documents stored on a remote server, documents stored and transmitted via the Internet, documents stored in one or more digital folders, documents stored on a communication server, documents stored on an e-mail server, or any other documents regardless of source or location. Similarly, the document manager 602 operates in conjunction with digital documents of any type or kind. For instance, as discussed above, the document manager 602 can access documents with extensions PDF, DOC, DOCX, TXT, XLS, XLSX, PPT, PPTX or other extensions.

The document manager 602 can also organize or arrange documents. For instance, the document manager 602 organizes documents based on an assigned icon, document type, time (or date) of creation, time (or date) of access, time (or date) of modification, document name (e.g., alphabetically), or other criteria. Thus, the document manager 602 can arrange documents based on one or more icons identified by the icon manager 610 or one or more topics identified by the generalizing facility 608.

The document manager 602 can also identify a group or corpus of documents. For instance, the document manager 602 can identify a group of documents stored in a folder on a computing device. Additionally or alternatively, the document manager 602 identifies a group of documents stored in a plurality of folders or on a plurality of computing devices. Moreover, as discussed above, the document manager 602 can recognize a digital folder or file structure, including digital parent folders and digital sub-folders.

In addition, as shown in FIG. 6, the digital navigation system 600 also includes the clustering engine 604. The clustering engine 604 can identify, calculate, create, generate, or organize one or more clusters with regard to digital documents. In particular, the clustering engine 604 can identify a cluster of documents based on text from each document. For example, the clustering engine 604 can organize a cluster of documents with similar topics or words.

The clustering engine 604 can utilize a variety of clustering algorithms. In one or more embodiments, the clustering engine 604 utilizes a blockclustering algorithm with 1- and 2-grams. Other embodiments utilize blockclustering with 1-grams, K-means clustering, or ToPMine topic modeling.

The clustering engine 604 identifies a cluster of documents from any type or variety of digital documents. Moreover, the clustering engine 604 identifies different clusters with regard to different sets of documents. For example, the clustering engine 604 can receive a first plurality of documents (e.g., from the document manager 602) and identify a cluster with regard to the first plurality of documents. Moreover, the clustering engine 604 can receive a second plurality of documents (e.g., from the document manager 602) and identify a different cluster with regard to the second plurality of documents.

The clustering engine 604 can utilize a supervised or unsupervised clustering approach. For instance, one or more embodiments utilize an unsupervised clustering approach, wherein the clustering engine 604 clusters documents into groups that are not pre-defined. This approach permits the clustering engine 604 to adapt clusters (and ultimately icons) to different groups of documents. Other embodiments utilize a supervised clustering approach, wherein the clustering engine 604 groups clusters into pre-defined categories.

As illustrated in FIG. 6, the digital navigation system 600 also includes the phrase extractor 606. The phrase extractor 606 can identify, extract, or calculate phrases, topics, or key terms from one or more digital documents. In particular, the phrase extractor 606 can identify representative phrases from a cluster. For example, the phrase extractor 606 can extract the most significant phrases or topics from a cluster of digital documents. In one or more embodiments, the phrase extractor 606 utilizes one or more topic modeling algorithms to identify phrases, topics, or key terms. For instance, in one or more embodiments the phrase extractor 606 utilizes the ToPMine topic modeling algorithm for phrase extraction.

Moreover, as illustrated in FIG. 6, the digital navigation system 600 also includes generalizing facility 608. The generalizing facility 608 can expand, generalize, modify, or broaden phrases, topics, or key terms. For instance, the generalizing facility 608 can identify one or more generalized terms that encompass phrases, topics, or key terms identified by the phrase extractor 606. More specifically, the generalizing facility 608 can expand one or more phrases identified from a document in a cluster to a level that the expanded phrase is applicable to the cluster as a whole.

For example, in one or more embodiments, the generalizing facility 608 utilizes a concept taxonomy (e.g., the concept taxonomy 616) to generalize one or more phrases. In particular, the generalizing facility 608 utilizes a concept taxonomy to identify generalized terms from the one or more phrases. Specifically, the generalizing facility 608 maps one or more phrases identified from a cluster of documents on to a node in a concept taxonomy. The generalizing facility 608 then analyzes other nodes (e.g., terms) in the concept taxonomy to identify nodes that encompass phrases identified from the cluster of documents (e.g., phrases identified by the generalizing facility 608) and are also closely related to the phrases identified from the cluster of documents.

Moreover, as illustrated in FIG. 6, the digital navigation system 600 also includes the icon manager 610. The icon manager 610 can identify, select, create, generate, access, and provide one or more icons. In particular, the icon manager 610 identifies one or more topical icons that correspond to the contents of one or more digital documents. For instance, the icon manager 610 selects icons that correspond to topics (e.g., generalized topics identified by the generalizing facility 608) associated with a cluster of documents (e.g., a cluster identified by the clustering engine 604).

In one or more embodiments, the icon manager 610 identifies icons corresponding to contents of digital documents by comparing one or more tags associated with icons with generalized terms associated with a cluster of documents (e.g., generalized terms identified by the generalizing facility 608). For example, the icon manager 610 compares the one or more tags and the generalized terms and selects the icon corresponding to the tags that are most similar to the generalized terms.

In particular, in one or more embodiments, the icon manager 610 converts the one or more tags to digital values, converts the generalized terms to digital values and compares the digital values corresponding to the one or more tags with the digital values corresponding to the one or more generalized terms. More specifically, the icon manager 610 converts one or more description tags applicable to each icon to a tag vector and convert the generalized terms to a generalized term vector and compute cosine similarities between the icon tag vectors and the generalized term vector. In one or more embodiments, the icon manager 610 selects an icon based on the computed cosine similarities (e.g., selects the icon corresponding to the tag vector with the highest similarity).

The icon manager 610 can access icons (and/or tags) from any available source. For instance, the icon manager 610 can identify icons and corresponding tags from icon data 614. Additionally, or alternatively, the icon manager 610 can access icons and tags from a third-party (e.g., via a third-party source available via the Internet). In yet other embodiments, the icon manager 610 can generate icons and tags. For instance, the icon manager 610 can access digital visual content and modify the content (e.g., resize, rotate, recolor to appear as an icon). Moreover, the icon manager 610 can utilize facial or object recognition technology to identify individuals, locations, structures, or objects within the visual content. Based on the identified objects, the icon manager 610 can generate tags corresponding to the generated icon.

The icon manager 610 can also identify, generate, or access icons related to any topic or phrase. For example, the icon manager 610 can identify icons related to food, clothes, politics, mathematics, history, technology, economics, or literature at any level of abstraction. For instance, the icon manager 610 can identify icons related to reading generally or to Shakespeare specifically.

Aside from selecting icons based on the contents of one or more documents, the icon manager 610 can also generate or modify icons based on a variety of other information. For instance, the icon manager 610 can modify the size, color, shape, rotation, or texture of an icon. Moreover, the icon manager 610 can modify an icon based on the size, source, type, last-modified date, last-accessed date, creation date, or title of a digital document.

Specifically, in one or more embodiments, the icon manager 610 modifies the color of icons based on the last date a digital document was accessed. Similarly, the icon manager 610 can modify the size of an icon based on the size of an electronic document (e.g., increase the size of an icon based on the size of a document). Moreover, the icon manager 610 can modify an icon reflecting a topic associated with a cluster of documents to include another icon reflecting the type of document associated with a particular document (e.g., a smaller image in the icon illustrating that the document is a PDF, DOC, or other type of digital document).

The icon manager 610 can also provide an icon for display. For instance, the icon manager 610 presents an icon for display via a display device associated with a computing device. In particular, the icon manager 610 can present an icon for display via a graphical user interface utilized to display one or more representations of digital documents in one or more digital folders.

The icon manager 610 can provide an icon for display together with a variety of other information. For instance, the icon manager 610 provides an icon for display together with a title of a digital document. Similarly, the icon manager 610 can provide an icon for display together with text indicating a size of a digital document, a date associated with a document, a document file extension, or a document type.

In addition, as illustrated in FIG. 6, the digital navigation system 600 also includes the storage manager 612. The storage manager 612 maintains data for the digital navigation system 600. The storage manager 612 can maintain data of any type, size, or kind, as necessary to perform the functions of the digital navigation system 600.

As illustrated, the storage manager 612 includes icon data 614. Icon data 614 may include data related to one or more icons utilized with regard to the digital navigation system 600. For instance, icon data 614 may include a plurality of icon images or a plurality of tags associated with one or more icons. Icon data 614 may also include a plurality of icons previously utilized by the digital navigation system 600 with regard to particular clusters, particular documents, or particular digital folders.

In addition, as illustrated in FIG. 6, the storage manager 612 also includes concept taxonomy 616. Concept taxonomy 616 can include any taxonomy of ideas, concepts, or phrases. For example, the concept taxonomy 616 can include a directed acyclic graph, with concepts pointing to sub-concepts. As described above, concept taxonomy 616 may include the Wikipedia taxonomy.

Furthermore, as shown in FIG. 6, the storage manager 612 can also include digital documents 618. Digital documents 618 can include any information regarding digital documents utilized by the digital navigation system 600. For instance, digital documents 618 can include a collection of documents, metadata regarding the documents, or information regarding folders or directories associated with digital documents. Similarly, digital documents 618 can include information regarding the size, date, author, modifier, or source of one or more digital documents.

Moreover, as illustrated in FIG. 6, the storage manager 612 also includes user profile 620. The user profile 620 can store data related to one or more users of the digital navigation system 600. For example, the user profile 620 may include information regarding utilization of the digital navigation system 600, information regarding utilization of one or more devices, demographic information, user input previously provided by one or more users, user preferences with regard to icons, user experience, or other information regarding one or more users.

Various components of the digital navigation system 600 utilize the user profile 620 to perform its functions. For example, the clustering engine 604 can utilize the user profile 620 to identify a number of clusters (e.g., a user that is more experienced with computers may be more comfortable navigating additional clusters and icons than a user with less experience with computers).

Moreover, as illustrated, the client device 650 implements the digital navigation system 600. The client device 650 can comprise any computing device, including computing devices described below with regard to FIG. 10 or client devices described below with regard to FIG. 7.

Each of the components 602-612 of the digital navigation system 600 and their corresponding elements (as shown in FIG. 6) may be in communication with one another using any suitable communication technologies. It will be recognized that although components 602-612 of the digital navigation system 600 and their corresponding elements are shown to be separate in FIG. 6, any of components 602-612 and their corresponding elements may be combined into fewer components, such as into a single facility or module, divided into more components, or configured into different components as may serve a particular embodiment.

The components 602-612 of the digital navigation system 600 and their corresponding elements can comprise software, hardware, or both. For example, the components 602-612 and their corresponding elements can comprise one or more instructions stored on a computer-readable storage medium and executable by processors of one or more computing devices. When executed by the one or more processors, the computer-executable instructions of the digital navigation system 600 can cause a client device and/or a server device to perform the methods described herein. Alternatively, the components 602-612 and their corresponding elements can comprise hardware, such as a special purpose processing device to perform a certain function or group of functions. Additionally or alternatively, the components 602-612 and their corresponding elements can comprise a combination of computer-executable instructions and hardware.

Furthermore, the components 602-612 may, for example, be implemented as one or more operating systems, as one or more stand-alone applications, as one or more modules of an application, as one or more plug-ins, as one or more library functions or functions that may be called by other applications, and/or as a cloud-computing model. Thus, the components 602-612 may be implemented as a stand-alone application, such as a desktop or mobile application. Furthermore, the components 602-612 may be implemented as one or more web-based applications hosted on a remote server. Alternatively or additionally, the components 602-612 may be implemented in a suit of mobile device applications or "apps." To illustrate, the components 602-612 may be implemented in an application, including but not limited to ADOBE DOCUMENT CLOUD, ADOBE ACROBAT, ADOBE PHOTOSHOP, or ADOBE ELEMENTS. "ADOBE," "DOCUMENT CLOUD," "ACROBAT," "PHOTOSHOP," and "ELEMENTS" are either registered trademarks or trademarks of Adobe Systems Incorporated in the United States and/or other countries.

Figure 7:
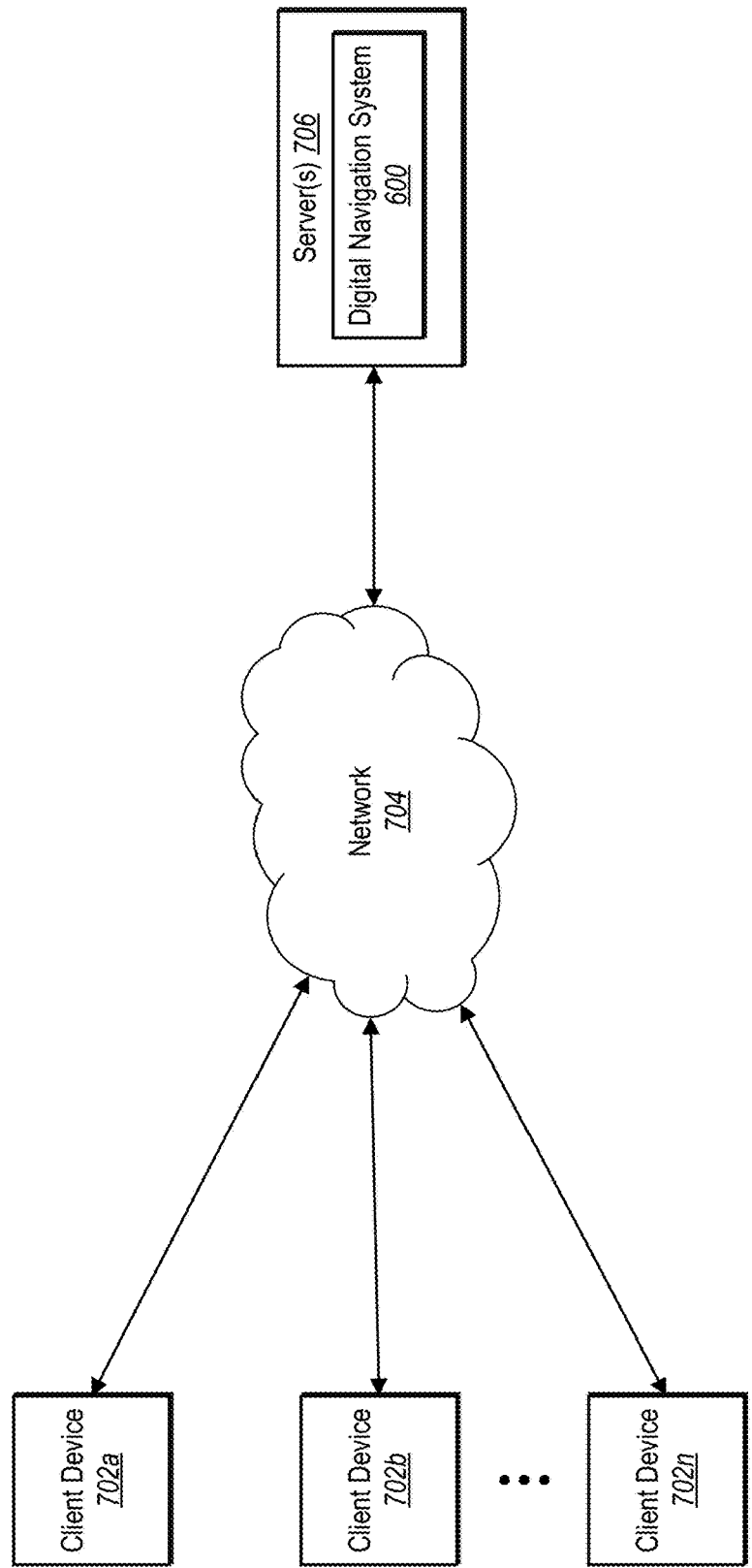
FIG. 7 illustrates a schematic diagram of an exemplary environment in which the digital navigation system can operate in accordance with one or more embodiments.

FIG. 7 illustrates a schematic diagram of one embodiment of an exemplary environment 700 in which the digital navigation system 600 can operate. In one or more embodiments, the exemplary environment 700 includes one or more client devices 702a, 702b, . . . 702n, a network 704, and server(s) 706. The network 704 may be any suitable network over which the computing devices can communicate. Example networks are discussed in more detail below with regard to FIG. 10.

As illustrated in FIG. 7, the environment 700 may include client devices 702a-702n. The client devices 702a-702n may comprise any computing device. For example, client devices 702a-702n may comprise one or more personal computers, laptop computers, mobile devices, mobile phones, tablets, special purpose computers, televisions, or other computing devices, including computing devices described below with regard to FIG. 10. For instance, in one or more embodiments, one or more of the client devices 702a-702n comprise the client device 650 implementing the digital navigation system 600.

In addition, the environment 700 may also include the server(s) 706. The server(s) 706 may generate, store, receive, and transmit any type of data, including icon data 614, concept taxonomy 616, digital documents 618 and/or user profile 620. For example, the server(s) 706 may transmit data to a client device, such as client device 702a. The server(s) 706 can also transmit electronic messages between one or more users of the environment 700. In one example embodiment, the server(s) 706 comprise a content server. The server(s) 706 can also comprise a communication server or a web-hosting server. Additional details regarding the server(s) 706 will be discussed below with respect to FIG. 10.

As illustrated, in one or more embodiments, the server(s) 706 can include the digital navigation system 600. In particular, digital navigation system 600 can comprise an application running on the server(s) 706 or a portion of a software application that can be downloaded from the server(s) 706. For example, the digital navigation system 600 can include a web hosting application that allows the client devices 702a-702n to interact with content hosted at the server(s) 706. To illustrate, in one or more embodiments of the exemplary environment 700, one or more client devices 702a-702n can access a webpage supported by the server(s) 706. In particular, the client device 702a can run a web application (e.g., a web browser) to allow a user to access, view, and/or interact with a webpage or website hosted at the server 706.

Although FIG. 7 illustrates a particular arrangement of the client devices 702a-702n, the network 704, and the server(s) 706, various additional arrangements are possible. For example, while FIG. 7 illustrates multiple separate client devices 702a-702n communicating with the server(s) 706 via the network 704, in one or more embodiments a single client device may communicate directly with the server(s) 706, bypassing the network 704.

Similarly, although the environment 700 of FIG. 7 is depicted as having various components, the environment 700 may have additional or alternative components. For example, the digital navigation system 600 can be implemented on a single computing device. In particular, the digital navigation system 600 may be implemented in whole by the client device 702a (e.g., the client device 702a may comprise the client device 650) or the digital navigation system 600 may be implemented in whole by the server(s) 706 (e.g., as illustrated). Alternatively, the digital navigation system 600 may be implemented across multiple devices or components (e.g., utilizing the client devices 702a-702n and the server(s) 706).

By way of example, in one or more embodiments the client device 702a can work in conjunction with the server(s) 706 to download, stream, or otherwise access, view, and/or interact with content hosted by the server(s) 706. The client device 702a can identify one or more digital documents or one or more digital folders to navigate or search. Moreover, as described in detail above, the client device 702a (e.g., the client device 650) can cluster a plurality of documents, extract topical phrases, identify generalized terms, select icons corresponding to generalized terms, and present icons for display.

Additionally or alternatively, in one or more embodiments the server(s) 706 can store electronic documents (i.e., via a cloud computing arrangement) and allow a user of the client device 702a to access electronic documents stored on the server(s) 706 via the network 704. The client device 702a can identify one or more digital documents or one or more digital folders on the server(s) 706 to navigate or search. Moreover, the server(s) 706 can create one or more clusters, identify topical phrases, generate generalized terms, and select icons corresponding to the generalized terms. In addition, the server(s) 706 may communicate, direct, provide or indicate the selected icons to the client device 702a for display, navigation, and/or search.

Figure 8:
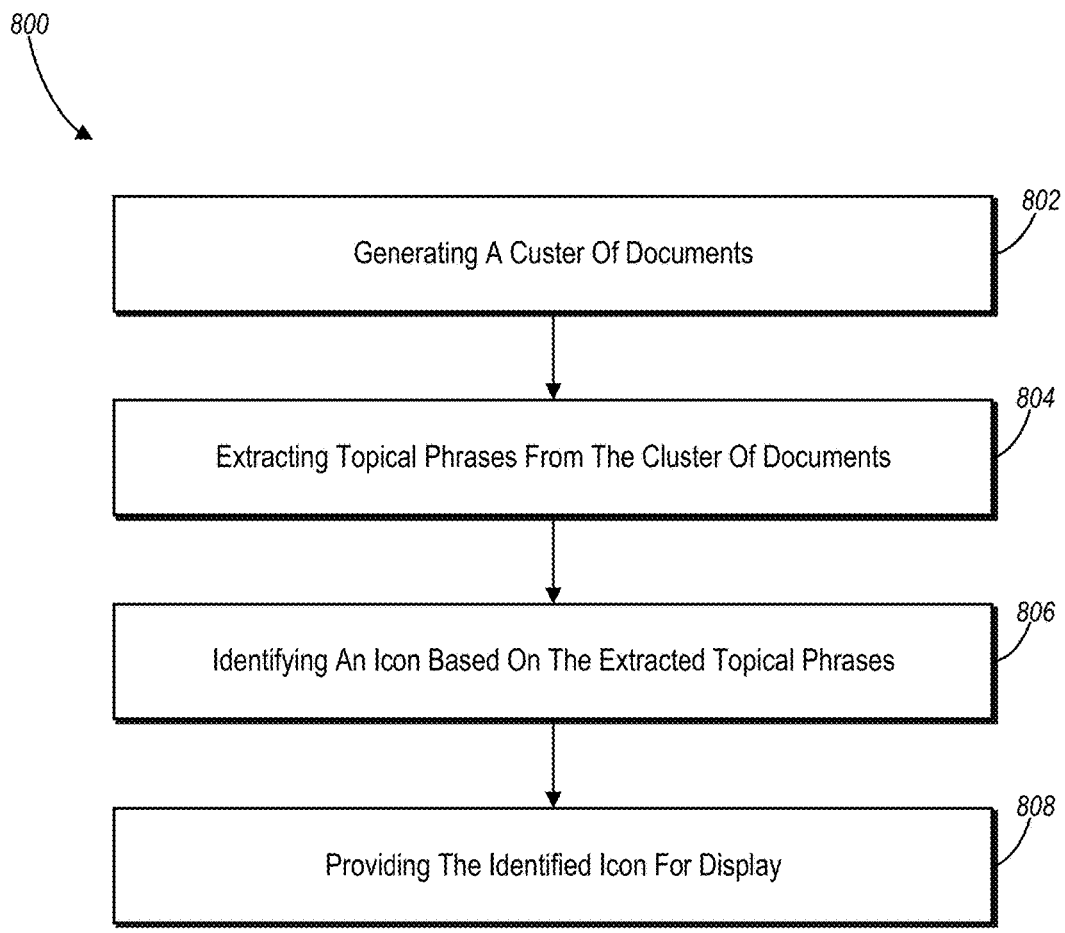
FIG. 8 illustrates a flowchart of a series of acts in a method of generating topical icons in accordance with one or more embodiments.
Figure 9:
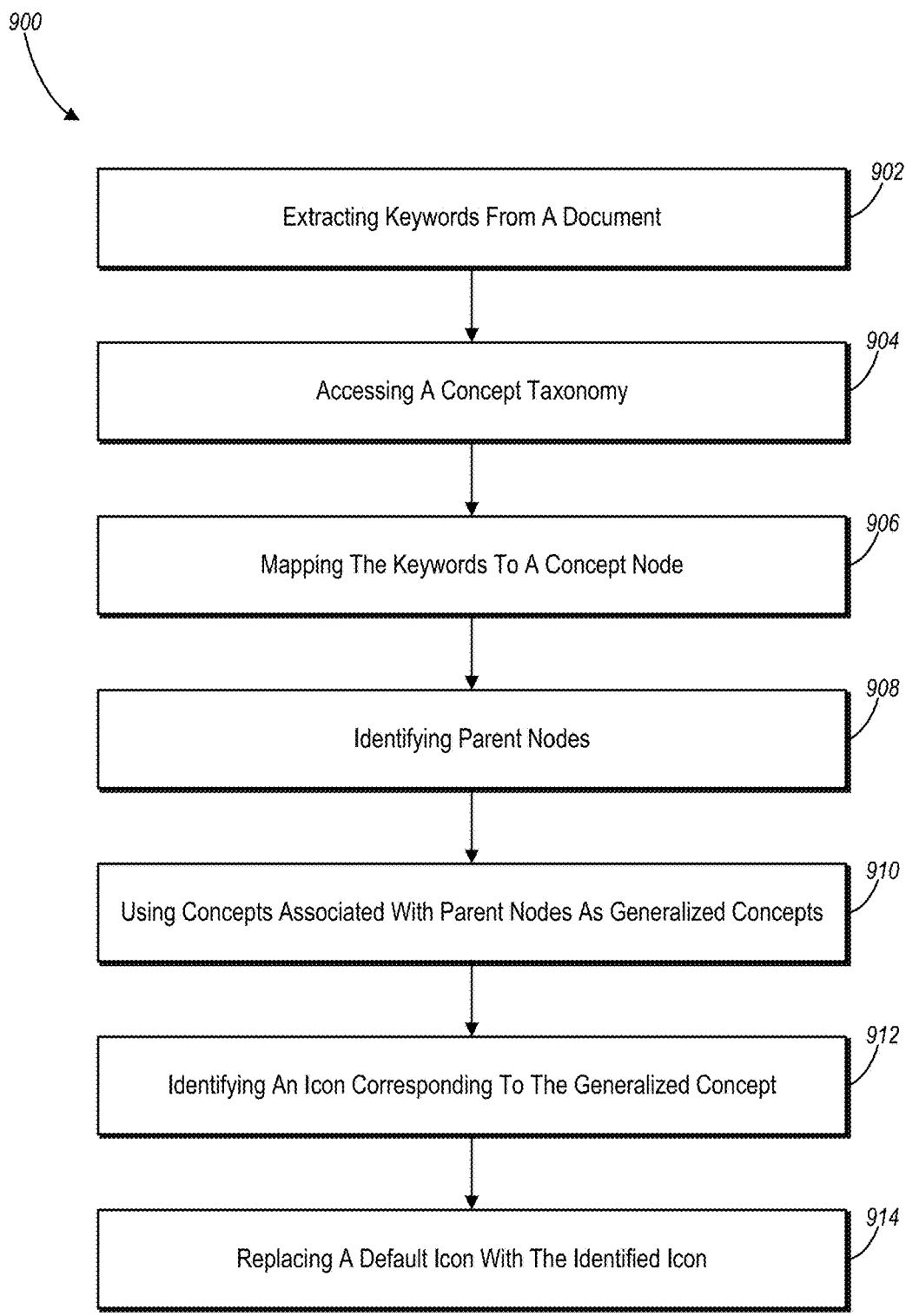
FIG. 9 illustrates a flowchart of another series of acts in a method of generating topical icons in accordance with one or more embodiments.

FIGS. 1-7, the corresponding text, and the examples, provide a number of different systems and devices that allows a user to facilitate creation and presentation of one or more topical icons for utilization in navigating digital files. In addition to the foregoing, embodiments can also be described in terms of flowcharts comprising acts and steps in a method for accomplishing a particular result. For example, FIGS. 8-9 illustrate flowcharts of exemplary methods in accordance with one or more embodiments. The methods described in relation to FIGS. 8-9 may be performed with less or more steps/acts or the steps/acts may be performed in differing orders. Additionally, the steps/acts described herein may be repeated or performed in parallel with one another or in parallel with different instances of the same or similar steps/acts.

FIG. 8 illustrates a flowchart of a series of acts in a method 800 of generating and displaying icons reflecting topics associated with the digital files in accordance with one or more embodiments. In one or more embodiments, the method 800 is performed in a digital medium environment that includes the digital navigation system 600. The method 800 is intended to be illustrative of one or more methods in accordance with the present disclosure, and is not intended to limit potential embodiments. Alternative embodiments can include additional, fewer, or different steps than those articulated in FIG. 8.

The method 800 includes an act 802 of generating a cluster of documents. In particular, the act 802 can include generating, by at least one processor and utilizing a clustering algorithm, a cluster of documents from a plurality of documents. Furthermore, the act 802 may also include grouping the plurality of documents into clusters of similar documents, the cluster of documents comprising one of the clusters of similar documents.

In addition, in one or more embodiments, the act 802 includes determining a number of clusters based on at least one of the following: user input, a number of documents in the plurality of documents, or characteristics of a user. Moreover, in one or more embodiments, the act 802 includes grouping the plurality of documents into a number of clusters of similar documents corresponding to the determined number of clusters.

As illustrated in FIG. 8, the method 800 also includes an act 804 of extracting topical phrases from the cluster of documents. In particular, the act 804 may include extracting, by the at least one processor, topical phrases from text of documents in the cluster of documents. For instance, the act 804 may include extracting topical phrases from text of documents in the cluster of documents utilizing a topical modeling algorithm.

As shown in FIG. 8, the method 800 also includes an act 806 of identifying an icon based on the extracted topical phrases. In particular, in one or more embodiments, the act 806 includes identifying, by the at least one processor, an icon reflecting a general topic of the documents in the cluster of documents based on the extracted topical phrases. For instance, in one or more embodiments, the act 806 includes identifying, by the at least one processor, generalized concepts corresponding to the topical phrases extracted from the text of the documents in the cluster of documents. Moreover, in one or more embodiments, the act 806 includes, identifying, by the at least one processor, the icon by determining which icon of a plurality of icons corresponds best to the generalized concepts.

Furthermore, the act 806 can include accessing a concept taxonomy comprising nodes corresponding to a plurality of concepts, mapping each topical phrase to a corresponding source node in the concept taxonomy, and identifying nodes that are parents to at least one of the corresponding source nodes in the concept taxonomy. In addition, the act 806 may include calculating a score for each parent node based on: a distance between each parent node and one or more of the source nodes, and a number of source nodes for which each parent node is a parent in the concept taxonomy. Moreover, the act 806 may include selecting a plurality of nodes with high scores and using the concepts corresponding to the selected plurality of nodes as the generalized concepts.

In addition, in one or more embodiments, the act 806 includes accessing a plurality of icons, each icon comprising one or more description tags. Moreover, in one or more embodiments, the act 806 includes transforming the generalized concepts and the description tags into digital values and comparing the digital values corresponding to the generalized concepts with the digital values corresponding to the description tags. Furthermore, in one or more embodiments, the act 806 includes identifying the icon with associated description tags with a digital value closest to the digital value of the generalized concepts.

For instance, in one or more embodiments, transforming the generalized concepts and the description tags into digital values comprises transforming the generalized concepts into a generalized concept vector and transforming the description tags corresponding to each icon to a digital tag vector. Similarly, in one or more embodiments, comparing the digital values corresponding to the generalized concepts with the digital values corresponding to the description tags comprises calculating a cosine similarity between the generalized concepts vector and each digital tag vector. Moreover, in one or more embodiments, identifying the icon with associated description tags with a digital value closest to the digital value of the generalized concepts comprises identifying the icon associated with the digital tag vector with the highest cosine similarity to the generalized concepts vector.

As illustrated in FIG. 8, the method 800 also includes an act 808 of providing the identified icon for display. In particular, the act 808 may include providing the identified icon reflecting the general topic of the documents in the cluster of documents for display in connection with each document in the cluster of documents. Moreover, the act 808 may also include modifying the icon associated with a document in the cluster of documents based on at least one of the following: a creation date of the document, a last-modified date of the document, a last-accessed date of the document, a size of the document, a type of the document, or a creator of the document; and providing the modified icon together with a title of the document for display. In addition, the act 808 can also include providing a legend for display, the legend comprising the icon and text associated with a topic related to the icon.

Furthermore, in one or more embodiments, the method 800 also comprises generating, by at least one processor and utilizing a clustering algorithm, a cluster of documents from a plurality of documents in a first digital folder and accessing a second digital folder containing a second plurality of documents containing text, the second plurality of documents comprising a particular document moved from the cluster of documents in the first digital folder to the second digital folder. In addition, in one or more embodiments, the method 800 includes generating a second cluster of documents from the second plurality of documents, the second cluster of documents comprising the particular document, and identifying a second icon different from the first icon based on the text of the second cluster of documents. Moreover, in one or more embodiments, the method 800 includes for each document in the second cluster of documents, including the particular document, providing the second icon for display.

In addition, FIG. 9 illustrates a flowchart of an additional or alternative series of acts in a method 900 of generating and displaying icons reflecting topics associated with the digital files in accordance with one or more embodiments. As illustrated, the method 900 includes an act 902 of extracting keywords from a document. In particular, the act 902 may include extracting, by at least one processor, one or more keywords or phrases from a document. For instance, the act 902 may include extracting one or more keywords or phrases from a document utilizing a topical modeling algorithm.

Moreover, in one or more embodiments the act 902 includes generating, by at least one processor and utilizing a clustering algorithm, a cluster of similar documents from a plurality of documents, the document being in the cluster of similar documents, wherein extracting, by the at least one processor, one or more keywords or phrases from the document comprises extracting one or more keywords or phrases from each of the documents in the cluster of similar documents.

As illustrated in FIG. 9, the method 900 also includes an act 904 of accessing a concept taxonomy. In particular, the act 904 may include accessing a concept taxonomy comprising a plurality of concepts represented by concept nodes. For instance, the act 904 may include accessing a concept taxonomy wherein a distance between concept nodes reflects relatedness between concepts corresponding to the concept nodes. Moreover, the act 904 may include accessing a concept taxonomy wherein concept nodes are arranged into families of related nodes.

Moreover, as illustrated in FIG. 9, the method 900 also includes an act 906 of mapping the keywords to a concept node. In particular, in one or more embodiments, the act 906 includes mapping each of the one or more keywords or phrases to a concept node in the concept taxonomy. For instance, the act 906 may include mapping each of the one or more keywords or phrases to a concept node in the concept taxonomy utilizing at least one of the following: exact string matching or stemmed string matching.

In addition, as showing in FIG. 9, the method 900 also includes an act 908 of identifying parent nodes. In particular, the act 908 may include identifying nodes that are parent nodes to the mapped concept nodes. For instance, in one or more embodiments, the act 908 includes identified nodes that are parent nodes within the same family as the mapped concept nodes.

Furthermore, FIG. 9 illustrates that the method 900 also includes an act 910 of using concepts associates with parent nodes as generalized concepts. In particular, the act 910 may include using one or more concepts associated with the identified parent nodes as generalized concepts of the document. For instance, in one or more embodiments, the act 910 includes calculating a score for each identified parent node based on: a distance between each identified parent node and each of the identified concept nodes and a number of identified concept nodes for which each identified parent node is a parent in the concept taxonomy. Moreover, in one or more embodiments, the act 910 also includes selecting concepts associated with parent nodes having high scores as the generalized concepts of the document.

In addition, as illustrated in FIG. 9, the method 900 also includes an act 912 of identifying an icon corresponding to the generalized concepts. In particular, in one or more embodiments, the act 912 includes identifying, by the at least one processor, an icon corresponding to one or more of the generalized concepts of the document. For example, the act 912 may include accessing a plurality of icons, each icon comprising one or more description tags and transforming the generalized concepts and the description tags into digital values. Moreover, the act 912 can include comparing the digital values corresponding to the generalized concepts with the digital values corresponding to the description tags. Furthermore, the act 912 may include identifying the icon with associated description tags with a digital value closest to the digital value of the generalized concepts.

For instance, in one or more embodiments, transforming the generalized concepts and the description tags into digital values comprises transforming the generalized concepts into a generalized concept vector and transforming the description tags corresponding to each icon to a digital tag vector. Similarly, in one or more embodiments, comparing the digital values corresponding to the generalized concepts with the digital values corresponding to the description tags comprises calculating a cosine similarity between the generalized concepts vector and each digital tag vector. Moreover, in one or more embodiments, identifying the icon with associated description tags with a digital value closest to the digital value of the generalized concepts comprises identifying the icon associated with the digital tag vector with the highest cosine similarity to the generalized concepts vector.

In addition, as shown in FIG. 9, the method 900 includes an act 914 of replacing a default icon with the identified icon. In particular, the act 914 may include replacing a default icon associated with the document in a file navigation display with the identified icon corresponding to the one or more generalized concepts of document. For instance, the act 914 may include replacing a default icon reflecting a file type of a document in a file navigation display with the identified icon corresponding to the one or more generalized concepts of the document. In addition, the act 914 may also include replacing a default icon associated with each document in the cluster of similar documents with the identified icon.

The act 914 may also include identifying a modification to the plurality of documents and based on the modification, selecting a second icon different from the first icon. For instance, in one or more embodiments the modification to the plurality of documents comprises at least one of the following: adding a new document to the plurality of documents, modifying text of at least one document from the plurality of documents, or deleting at least one of the documents from the plurality of documents.

In addition, in one or more embodiments, the act 914 also includes modifying the icon based on at least one of the following: a creation date of the document, a last-modified date of the document, a last-accessed date of the document, a size of the document, a type of the document, or a creator of the document.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 10:
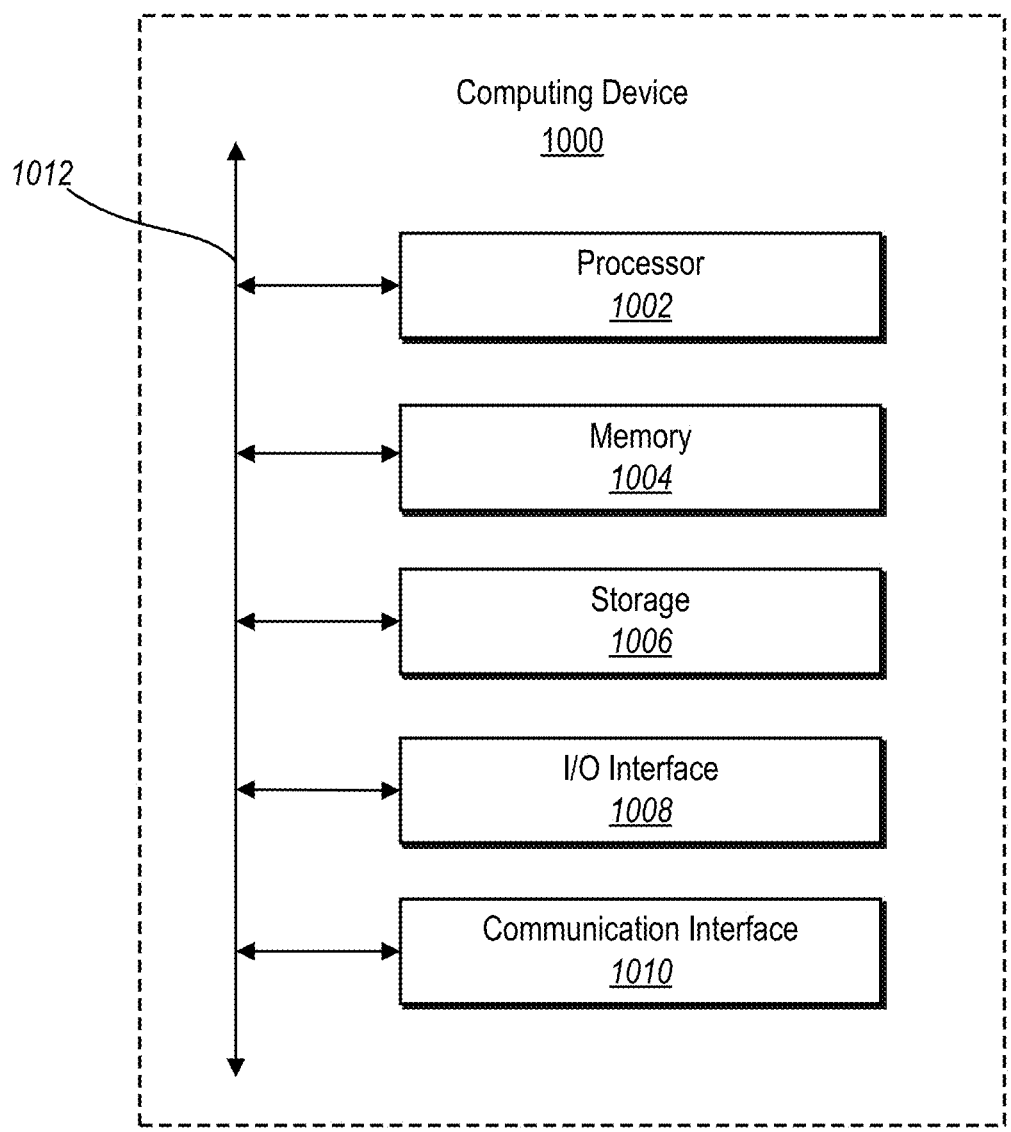
FIG. 10 illustrates a block diagram of an exemplary computing device in accordance with one or more embodiments.

FIG. 10 illustrates, in block diagram form, an exemplary computing device 1000 that may be configured to perform one or more of the processes described above. One will appreciate that the digital navigation system 600 can comprise implementations of the computing device 1000. As shown by FIG. 10, the computing device can comprise a processor 1002, memory 1004, a storage device 1006, an I/O interface 1008, and a communication interface 1010. While an exemplary computing device 1000 is shown in FIG. 10, the components illustrated in FIG. 10 are not intended to be limiting. Additional or alternative components may be used in other embodiments. Furthermore, in certain embodiments, a computing device 1000 can include fewer components than those shown in FIG. 10. Components of computing device 1000 shown in FIG. 10 will now be described in additional detail.

In particular embodiments, processor(s) 1002 includes hardware for executing instructions, such as those making up a computer program. As an example and not by way of limitation, to execute instructions, processor(s) 1002 may retrieve (or fetch) the instructions from an internal register, an internal cache, memory 1004, or a storage device 1006 and decode and execute them. In particular embodiments, processor(s) 1002 may include one or more internal caches for data, instructions, or addresses. As an example and not by way of limitation, processor(s) 1002 may include one or more instruction caches, one or more data caches, and one or more translation lookaside buffers (TLBs). Instructions in the instruction caches may be copies of instructions in memory 1004 or storage 1006.

The computing device 1000 includes memory 1004, which is coupled to the processor(s) 1002. The memory 1004 may be used for storing data, metadata, and programs for execution by the processor(s). The memory 1004 may include one or more of volatile and non-volatile memories, such as Random Access Memory ("RAM"), Read Only Memory ("ROM"), a solid state disk ("SSD"), Flash, Phase Change Memory ("PCM"), or other types of data storage. The memory 1004 may be internal or distributed memory.

The computing device 1000 includes a storage device 1006 includes storage for storing data or instructions. As an example and not by way of limitation, storage device 1006 can comprise a non-transitory storage medium described above. The storage device 1006 may include a hard disk drive (HDD), a floppy disk drive, flash memory, an optical disc, a magneto-optical disc, magnetic tape, or a Universal Serial Bus (USB) drive or a combination of two or more of these. Storage device 1006 may include removable or non-removable (or fixed) media, where appropriate. Storage device 1006 may be internal or external to the computing device 1000. In particular embodiments, storage device 1006 is non-volatile, solid-state memory. In particular embodiments, storage device 1006 includes read-only memory (ROM). Where appropriate, this ROM may be mask programmed ROM, programmable ROM (PROM), erasable PROM (EPROM), electrically erasable PROM (EEPROM), electrically alterable ROM (EAROM), or flash memory or a combination of two or more of these.

The computing device 1000 also includes one or more input or output ("I/O") devices/interfaces 1008, which are provided to allow a user to provide input to (such as user strokes), receive output from, and otherwise transfer data to and from the computing device 1000. These I/O devices/interfaces 1008 may include a mouse, keypad or a keyboard, a touch screen, camera, optical scanner, network interface, modem, other known I/O devices or a combination of such I/O devices/interfaces 1008. The touch screen may be activated with a stylus or a finger.

The I/O devices/interfaces 1008 may include one or more devices for presenting output to a user, including, but not limited to, a graphics engine, a display (e.g., a display screen), one or more output drivers (e.g., display drivers), one or more audio speakers, and one or more audio drivers. In certain embodiments, devices/interfaces 1008 is configured to provide graphical data to a display for presentation to a user. The graphical data may be representative of one or more graphical user interfaces and/or any other graphical content as may serve a particular implementation.

The computing device 1000 can further include a communication interface 1010. The communication interface 1010 can include hardware, software, or both. The communication interface 1010 can provide one or more interfaces for communication (such as, for example, packet-based communication) between the computing device and one or more other computing devices 1000 or one or more networks. As an example and not by way of limitation, communication interface 1010 may include a network interface controller (NIC) or network adapter for communicating with an Ethernet or other wire-based network or a wireless NIC (WNIC) or wireless adapter for communicating with a wireless network, such as a WI-FI.

This disclosure contemplates any suitable network and any suitable communication interface 1010. As an example and not by way of limitation, computing device 1000 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computing system 1000 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination thereof. Computing device 1000 may include any suitable communication interface 1010 for any of these networks, where appropriate.

The computing device 1000 can further include a bus 1012. The bus 1012 can comprise hardware, software, or both that couples components of computing device 1000 to each other. As an example and not by way of limitation, bus 1012 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination thereof.

In the foregoing specification, the invention has been described with reference to specific exemplary embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the invention is, therefore, indicated by the appended claims rather than by the foregoing description. All changes that come within the meaning and range of equivalency of the claims are to be embraced within their scope.

We claim:

1. In a digital medium environment for navigating digital files, a method of generating and displaying icons reflecting topics associated with the digital files, comprising:
   generating, by at least one processor and utilizing a clustering algorithm, a cluster of documents from a plurality of documents;
   extracting, by the at least one processor, topical phrases from text of documents in the cluster of documents;
   mapping the topical phrases to source nodes in a concept taxonomy;
   selecting a general topic corresponding to a parent node in the concept taxonomy based on a distance between the parent node and one or more of the source nodes;
   identifying, by the at least one processor, an icon reflecting the general topic; and
   providing the identified icon reflecting the general topic for display in connection with each document in the cluster of documents.

2. The method of claim 1, wherein generating, the cluster of documents from the plurality of documents comprises grouping the plurality of documents into a plurality of clusters comprising the cluster of documents.

3. The method of claim 2, wherein grouping the plurality of documents into the plurality of clusters comprises:
   determining a number of clusters based on at least one of the following: user input, a number of documents in the plurality of documents, or characteristics of a user; and grouping the plurality of documents into the plurality of clusters based on the determined number of clusters.

4. The method of claim 1, further comprising:
calculating a score for the parent node based on the distance between the parent node and the one or more of the source nodes:
comparing the score for the parent node with an additional score for an additional parent node; and
selecting the general topic corresponding to the parent node based on comparing the score for the parent node and the additional score for the additional parent node.

5. The method of claim 4, wherein calculating the score for the parent node is further based on a number of sources nodes for which the parent node is a parent in the concept taxonomy.

6. The method of claim 4, wherein identifying the icon reflecting the general topic comprises:
accessing a plurality of icons corresponding to description tags;
transforming the general topic and the description tags into digital values;
comparing the digital values corresponding to the general topic with the digital values corresponding to the description tags; and
identifying the icon based on comparing the digital values corresponding to the general topic with the digital values corresponding to the description tags.

7. The method of claim 6, wherein:
transforming the general topic and the description tags into digital values comprises transforming the general topic into a general topic vector and transforming the description tags to digital tag vectors;
comparing the digital values corresponding to the general topic with the digital values corresponding to the description tags comprises calculating a cosine similarity between the general topic vector and each digital tag vector; and
identifying the icon by identifying the icon associated with the digital tag vector with a highest cosine similarity.

8. The method of claim 1, further comprising:
modifying the icon associated with a document in the cluster of documents based on at least one of the following: a creation date of the document, a last-modified date of the document, a last-accessed date of the document, a size of the document, a type of the document, or a creator of the document; and
providing the modified icon together with a title of the document for display.

9. The method of claim 1, wherein the plurality of documents are contained in a first digital folder and further comprising:
accessing a second digital folder containing a second plurality of documents containing text, the second plurality of documents comprising a particular document moved from the cluster of documents in the first digital folder to the second digital folder;
generating a second cluster of documents from the second plurality of documents, the second cluster of documents comprising the particular document;
identifying an additional icon different from the icon based on the text of the second cluster of documents; and
for each document in the second cluster of documents, including the particular document, providing the additional icon for display.

10. A non-transitory computer readable medium storing instructions that, when executed by at least one processor, cause a computer system to:
extract keywords from one or more documents;
access a concept taxonomy comprising a plurality of concepts represented by concept nodes;
map the keywords to concept nodes in the concept taxonomy;
identify parent nodes to the mapped concept nodes;
determine, for a parent node of the parent nodes, a number of the mapped concept nodes for which the parent node is a parent in the concept taxonomy;
select a generalized concept of the one or more documents corresponding to the parent node based on the number of the mapped concept nodes;
identify an icon corresponding to the generalized concept of the one or more documents; and
replace a default icon associated with the one or more documents in a file navigation display with the identified icon corresponding to the generalized concept of the one or more documents.

11. The non-transitory computer readable medium of claim 10, further comprising instructions that, when executed by the at least one processor, cause the computer system to:
generate, utilizing a clustering algorithm, a cluster of documents from a plurality of documents, the cluster of documents comprising the one or more documents;
extract the keywords from the one or more documents comprises extracting one or more keywords from each of the documents in the cluster of documents; and
replace a default icon associated with each document in the cluster of documents with the identified icon.

12. The non-transitory computer readable medium of claim 11, further comprising instructions that, when executed by the at least one processor, cause the computer system to:
identify a modification to the plurality of documents; and
based on the modification, select an additional icon different from the icon.

13. The non-transitory computer readable medium of claim 12, wherein the modification to the plurality of documents comprises at least one of the following: adding a new document to the plurality of documents, modifying text of at least one document from the plurality of documents, or deleting at least one of the documents from the plurality of documents.

14. The non-transitory computer readable medium of claim 10, further comprising instructions that, when executed by the at least one processor, cause the computer system to modify the icon based on at least one of the following: a creation date of the one or more documents, a last-modified date of the one or more documents, a last-accessed date of the one or more documents, a size of the one or more documents, a type of the one or more documents, or a creator of the one or more documents.

15. The non-transitory computer readable medium of claim 10, further comprising instructions that, when executed by the at least one processor, cause the computer system to select the generalized concept by:
calculating a score for the parent node based on:
a distance between the parent node and one or more of the mapped concept nodes, and
the number of the mapped concept nodes; and
comparing the score for the parent node with a second score for a second parent node to select the generalized concept corresponding to the parent node.

16. The non-transitory computer readable medium of claim 15, further comprising instructions that, when executed by the at least one processor, cause the computer system to identify the icon corresponding to the generalized concept of the one or more documents by:
- accessing a plurality of icons corresponding to description tags;
- transforming the generalized concept and the description tags into digital values;
- comparing the digital values corresponding to the generalized concept with the digital values corresponding to the description tags; and
- identifying the icon based on comparing the digital values corresponding to the generalized concept with the digital values corresponding to the description tags.

17. The non-transitory computer readable medium of claim 16, wherein:
- transforming the generalized concept and the description tags into digital values comprises transforming the generalized concept into a generalized concept vector and transforming the description tags to digital tag vectors;
- comparing the digital values corresponding to the generalized concept with the digital values corresponding to the description tags comprises calculating a cosine similarity between the generalized concepts vector and each digital tag vector; and
- identifying the icon comprises identifying the icon with the highest cosine similarity to the generalized concept vector.

18. A system, comprising:
- at least one processor;
- at least one non-transitory computer readable storage medium storing instructions thereon that, when executed by the at least one processor, cause the system to:
- generate, utilizing a clustering algorithm, a cluster of documents from a plurality of documents;
- extract topical phrases from text of documents in the cluster of documents;
- identify generalized concepts corresponding to the topical phrases extracted from the text of the documents in the cluster of documents by:
  - mapping the topical phrases to a-corresponding source nodes in a concept taxonomy, the concept taxonomy comprising nodes corresponding to a plurality of concepts;
  - identifying parent nodes to the source nodes in the concept taxonomy;
  - selecting generalized concepts from the concepts corresponding to the parent nodes based on a distance between each parent node and one or more of the source nodes;
- identify an icon reflecting a general topic of the documents in the cluster of documents by comparing description tags associated with a plurality of icons with the generalized concepts; and
- provide the identified icon reflecting the general topic of the documents in the cluster of documents for display in connection with each document in the cluster of documents.

19. The system of claim 18, wherein the instructions, when executed by the at least one processor, cause the system to generate the cluster of documents from the plurality of documents by:
- determining a number of clusters based on at least one of the following: user input, a number of documents in the plurality of documents, or characteristics of a user; and
- grouping the plurality of documents into clusters of documents based on the determined number of clusters.

20. The system of claim 18, wherein the instructions, when executed by the at least one processor, cause the system to identify the icon reflecting the general topic of the documents in the cluster of documents by:
- transforming the generalized concepts into a generalized concept vector;
- transforming the description tags to digital tag vectors; and
- calculating a cosine similarity between the generalized concepts vector and each digital tag vector.

* * * * *